(12) United States Patent
Shimezawa et al.

(10) Patent No.: US 9,887,810 B2
(45) Date of Patent: Feb. 6, 2018

(54) TERMINAL, BASE STATION, AND COMMUNICATION METHOD

(71) Applicant: Sharp Kabushiki Kaisha, Osaka-shi, Osaka (JP)

(72) Inventors: Kazuyuki Shimezawa, Osaka (JP); Kimihiko Imamura, Osaka (JP); Alvaro Ruiz Delgado, Osaka (JP); Toshizo Nogami, Osaka (JP); Naoki Kusashima, Osaka (JP); Shoichi Suzuki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 227 days.

(21) Appl. No.: 14/759,285

(22) PCT Filed: Jul. 23, 2014

(86) PCT No.: PCT/JP2014/069482
§ 371 (c)(1),
(2) Date: Jul. 6, 2015

(87) PCT Pub. No.: WO2015/019852
PCT Pub. Date: Feb. 12, 2015

(65) Prior Publication Data
US 2016/0149672 A1  May 26, 2016

(30) Foreign Application Priority Data

Aug. 5, 2013 (JP) .................................. 2013-162217
Aug. 8, 2013 (JP) .................................. 2013-164684

(51) Int. Cl.
*H04W 4/00* (2009.01)
*H04L 1/18* (2006.01)
(Continued)

(52) U.S. Cl.
CPC .......... *H04L 1/1812* (2013.01); *H04L 1/1861* (2013.01); *H04L 1/1864* (2013.01);
(Continued)

(58) Field of Classification Search
USPC .................................. 370/236–280, 328–338
See application file for complete search history.

(56) References Cited

U.S. PATENT DOCUMENTS 8,488,549 B2 * 7/2013 Yang .......................... H04L 1/18
370/329
8,917,605 B2 * 12/2014 Pelletier .............. H04W 52/365
370/236

(Continued)

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213 V11.3.0, Jun. 2013, pp. 1-176.

(Continued)

*Primary Examiner* — Man Phan
(74) *Attorney, Agent, or Firm* — Keating & Bennett, LLP

(57) ABSTRACT

A terminal includes a transmission unit which transmits HARQ response information to transmission of a downlink-shared channel in one or more predetermined subframes based on resources of one or more uplink control channels. When a certain subframe in the predetermined subframes is a first subframe, a resource of an uplink control channel is given by an arithmetic operation using at least an initial value of a control channel element for use in transmitting a physical downlink control channel in the certain subframe and a first value configured by a higher layer. When a certain subframe in the predetermined subframes is a second subframe, a resource of an uplink control channel is given by an arithmetic operation using at least an initial value of a control channel element for use in transmitting a physical
(Continued)

downlink control channel in the certain subframe and a second value configured by a higher layer.

4 Claims, 21 Drawing Sheets

(51) Int. Cl.
    *H04W 72/04*     (2009.01)
    *H04L 5/14*     (2006.01)
    *H04L 5/00*     (2006.01)

(52) U.S. Cl.
    CPC .......... *H04L 1/1896* (2013.01); *H04L 5/0053* (2013.01); *H04L 5/0055* (2013.01); *H04L 5/0082* (2013.01); *H04L 5/0094* (2013.01); *H04L 5/1469* (2013.01); *H04W 72/0406* (2013.01); *H04W 72/0446* (2013.01); *H04L 5/001* (2013.01); *H04L 5/0023* (2013.01); *H04L 5/0048* (2013.01)

(56) References Cited

U.S. PATENT DOCUMENTS

| | | | | |
|---|---|---|---|---|
| 9,055,568 B2 * | 6/2015 | Yang | .......................... | H04L 1/18 |
| 9,084,243 B2 * | 7/2015 | Yang | ..................... | H04L 1/0027 |
| 9,277,547 B2 * | 3/2016 | Yang | .......................... | H04L 1/18 |
| 9,350,510 B2 * | 5/2016 | Park | ....................... | H04L 5/0053 |
| 9,386,565 B2 * | 7/2016 | Yang | ..................... | H04L 1/1861 |
| 9,432,973 B2 * | 8/2016 | Tang | .................... | H04W 72/042 |
| 9,485,060 B2 * | 11/2016 | Nayeb Nazar | .......... | H04L 1/007 |
| 9,537,614 B2 * | 1/2017 | Liang | ..................... | H04L 1/1614 |
| 9,609,636 B2 * | 3/2017 | Yang | ................. | H04W 72/0413 |

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, Jun. 2013, pp. 1-108.

\* cited by examiner

FIG. 11

| UPLINK-DOWNLINK CONFIGURATION | DOWNLINK-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 13

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION | D | S | U | D | D | D | S | U | D | D |
| EPDCCH SUBFRAME CONFIGURATION | 1 | 0 | 0 | 0 | 1 | 1 | 0 | 0 | 1 | 0 |

⇩

| | 0 | 1 | 2 | 3 | 4 | 5 | 6 | 7 | 8 | 9 |
|---|---|---|---|---|---|---|---|---|---|---|
| MONITORING OF PDCCH SS | – | O | – | O | – | – | O | – | – | O |
| MONITORING OF EPDCCH SS | O | – | – | – | O | O | – | – | O | – |

FIG. 14

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | D | D | S | U | U | D |
| UPLINK-DOWNLINK CONFIGURATION 2 | D | S | U | D | D | D | S | U | D | D |

⇩

| | 0 | 1 | 2 | 3 | 4 | 5 | 6 | 7 | 8 | 9 |
|---|---|---|---|---|---|---|---|---|---|---|
| MONITORING OF PDCCH SS | – | – | – | – | – | – | – | – | – | – |
| FIRST MONITORING OF EPDCCH SS | O | O | – | – | O | O | O | – | – | O |
| SECOND MONITORING OF EPDCCH SS | – | – | – | O | – | – | – | – | O | – |

FIG. 17

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | D | D | S | U | U | D |
| UPLINK-DOWNLINK CONFIGURATION 2 | D | S | U | D | D | D | S | U | D | D |

⇩

|  | 0 | 1 | 2 | 3 | 4 | 5 | 6 | 7 | 8 | 9 |
|---|---|---|---|---|---|---|---|---|---|---|
| FIRST MONITORING OF PDCCH SS | ○ | ○ | – | – | ○ | ○ | ○ | – | – | ○ |
| SECOND MONITORING OF PDCCH SS | – | – | – | ○ | – | – | – | – | ○ | – |

FIG. 18

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | D | D | S | U | U | D |
| UPLINK-DOWNLINK CONFIGURATION 2 | D | S | U | D | D | D | S | U | D | D |

⇩

|  | 0 | 1 | 2 | 3 | 4 | 5 | 6 | 7 | 8 | 9 |
|---|---|---|---|---|---|---|---|---|---|---|
| MONITORING OF PDCCH SS | ○ | ○ | – | – | ○ | ○ | ○ | – | – | ○ |
| MONITORING OF EPDCCH SS | – | – | – | ○ | – | – | – | – | ○ | – |

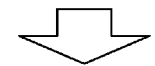
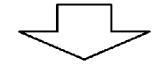

FIG. 21

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION | 1 | 0 | 0 | 1 | 1 | 0 | 1 | 0 | 1 | 0 |

⇩

|  | 0 | 1 | 2 | 3 | 4 | 5 | 6 | 7 | 8 | 9 |
|---|---|---|---|---|---|---|---|---|---|---|
| MONITORING OF PDCCH SS1 | – | ○ | – | – | – | ○ | – | – | – | ○ |
| FIRST MONITORING OF EPDCCH SS1 | ○ | – | – | – | – | – | ○ | – | – | – |
| SECOND MONITORING OF EPDCCH SS1 | – | – | – | ○ | ○ | – | – | – | ○ | – |
| MONITORING OF PDCCH SS2 | ○ | ○ | – | – | – | ○ | ○ | – | – | – |
| MONITORING OF EPDCCH SS2 | – | – | – | ○ | ○ | – | – | – | ○ | ○ |

FIG. 22

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION 1 | 1 | 0 | 0 | 1 | 0 | 0 | 1 | 0 | 0 | 1 |
| EPDCCH SUBFRAME CONFIGURATION 2 | 0 | 0 | 0 | 0 | 1 | 0 | 0 | 0 | 1 | 1 |

⇩

|  | 0 | 1 | 2 | 3 | 4 | 5 | 6 | 7 | 8 | 9 |
|---|---|---|---|---|---|---|---|---|---|---|
| MONITORING OF PDCCH SS1 | – | ○ | – | – | ○ | ○ | – | – | ○ | – |
| MONITORING OF EPDCCH SS1 | ○ | – | – | ○ | – | – | ○ | – | – | ○ |
| MONITORING OF PDCCH SS2 | ○ | ○ | – | ○ | – | ○ | ○ | – | – | – |
| MONITORING OF EPDCCH SS2 | – | – | – | – | ○ | – | – | – | ○ | ○ |

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION 1 | 1 | 0 | 0 | 1 | 0 | 0 | 1 | 0 | 0 | 1 |
| EPDCCH SUBFRAME CONFIGURATION 2 | 0 | 0 | 0 | 0 | 1 | 0 | 0 | 0 | 1 | 1 |

| | 0 | 1 | 2 | 3 | 4 | 5 | 6 | 7 | 8 | 9 |
|---|---|---|---|---|---|---|---|---|---|---|
| MONITORING OF PDCCH SS1 | – | ○ | – | – | ○ | ○ | – | – | ○ | – |
| FIRST MONITORING OF EPDCCH SS1 | ○ | – | – | – | – | – | ○ | – | – | – |
| SECOND MONITORING OF EPDCCH SS1 | – | – | – | ○ | – | – | – | – | – | ○ |
| MONITORING OF PDCCH SS2 | ○ | ○ | – | ○ | – | ○ | ○ | – | – | – |
| MONITORING OF EPDCCH SS2 | – | – | – | – | ○ | – | – | – | ○ | ○ |

TERMINAL, BASE STATION, AND COMMUNICATION METHOD

TECHNICAL FIELD

The present invention relates to a terminal, a base station, and a communication method.

The present application claims priority based on Japanese Patent Application No. 2013-162217, filed Aug. 5, 2013, and Japanese Patent Application No. 2013-164684, filed Aug. 8, 2013, the contents of which are incorporated herein by reference.

BACKGROUND ART

A radio access system and a radio network (hereinafter, referred to as "Long Term Evolution: LTE" or "Evolved Universal Terrestrial Radio Access: EUTRA") of cellular mobile communication have been discussed in a 3rd Generation Partnership Project (3GPP). In LTE, a base station device (base station) is also referred to as eNodeB (evolved NodeB), and a mobile station device (mobile station, terminal) is referred to as UE (User Equipment). LTE is a cellular communication system where a plurality of areas covered by the base station device are allocated in cells. A single base station device may manage a plurality of cells.

LTE corresponds to frequency division duplex (FDD) and time division duplex (TDD). LTE using the FDD system is referred to as FD-LTE or LTE FDD. TDD is a technique which performs frequency division multiplexing on an uplink signal and a downlink signal, enabling full duplex communication in at least two frequency bands. LTE using the TDD system is referred to as TD-LTE or LTE TDD. TDD is a technique which performs time division multiplexing on an uplink signal and a downlink signal, enabling full duplex communication in a single frequency band. The details of FD-LTE and TD-LTE are disclosed in NPL 1.

A base station can transmit, to a terminal, a reference signal (referred to as RS) which is a known signal between the base station and the terminal. In regards to the reference signal, a plurality of reference signals can be transmitted for various purposes, such as demodulation of signals or channels and reports of channel states. For example, a cell-specific reference signal is transmitted as a reference signal specific to a cell in all downlink subframes. For example, a UE-specific reference signal is transmitted as a reference signal specific to a terminal in a resource to which a data signal to the terminal is mapped. The details of the reference signal are disclosed in NPL 1.

In a communication system, a base station and a terminal can implement communication using control information. In particular, in the downlink of LTE, the base station can notify the terminal of the control information through control channels, such as a PDCCH (Physical Downlink Control Channel) and an EPDCCH (Enhanced Physical Downlink Control Channel). The PDCCH is transmitted in association with a cell-specific reference signal, and the EPDCCH is transmitted in association with a UE-specific reference signal. In the LTE of the related art, the PDCCH can be mapped to a common search space (CSS) which is a region specific to a cell and/or to a UE-specific search space (USS) which is a region specific to a terminal. The EPDCCH can be mapped only to the UE-specific search space. For this reason, for example, when transmitting the control channel using the common search space, the base station notifies of control information through the PDCCH. The details of the control channel are disclosed in NPL 2.

CITATION LIST

NPL 1: 3rd Generation Partnership Project; Technical Specification Group Radio Access Network; Evolved Universal Terrestrial Radio Access (E-UTRA); Physical Channels and Modulation (Release 11), 3GPP TS 36.211 V11.3.0 (2013-06).

NPL 2: 3rd Generation Partnership Project; Technical Specification Group Radio Access Network; Evolved Universal Terrestrial Radio Access (E-UTRA); Physical layer procedures (Release 11), 3GPP TS 36.213 V11.3.0 (2013-06).

DISCLOSURE OF THE INVENTION

Problems to be Solved by the Invention

However, since the PDCCH is transmitted in association with the cell-specific reference signal, the common search space is limited only to a subframe to which the cell-specific reference signal is mapped. This limitation interferes with efficient notification of the control information, leading to significant deterioration in transmission efficiency.

The invention has been accomplished in consideration of the above-described problems, and an object of the invention is to provide a base station, a terminal, a communication system, a communication method, and an integrated circuit capable of improving transmission efficiency in a communication system where a base station and a terminal communicate with each other.

Means for Solving the Problems (1) In order to attain the above-described object, an embodiment of the invention provides the following means. That is, a terminal of this embodiment which communicates with a base station includes a transmission unit which transmits HARQ response information to transmission of a downlink-shared channel in one or more predetermined subframes based on resources of one or more uplink control channels. When a certain subframe in the predetermined subframes is a first subframe, a resource of an uplink control channel to a downlink-shared channel represented by detection of a physical downlink control channel in the certain subframe may be given by an arithmetic operation using at least an initial value of a control channel element for use in transmitting a physical downlink control channel in the certain subframe and a first value set by a higher layer. When a certain subframe in the predetermined subframes is a second subframe, a resource of an uplink control channel to a downlink-shared channel represented by detection of a physical downlink control channel in the certain subframe may be given by an arithmetic operation using at least an initial value of a control channel element for use in transmitting a physical downlink control channel in the certain subframe and a second value set by a higher layer.

(2) In the terminal of this embodiment, the first subframe and the second subframe may be determined based on a first parameter and a second parameter which are an uplink-downlink configuration in a higher layer.

(3) In the terminal of this embodiment, a subframe which is represented as a downlink subframe or a special subframe by the first parameter may not be used as an uplink subframe. A subframe represented as an uplink subframe or a special subframe by the second parameter may not be used as a downlink subframe.

(4) A terminal of this embodiment which communicates with a base station includes a transmission unit which transmits HARQ response information to transmission of a downlink-shared channel in one or more predetermined subframes based on resources of one or more uplink control channels. When a certain subframe in the predetermined subframes is a first subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe. When a certain subframe in the predetermined subframes is a second subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe and the number of extended control channel elements in the first subframe.

(5) In the terminal of this embodiment, the first subframe and the second subframe may be determined based on a first parameter and a second parameter which are an uplink-downlink configuration in a higher layer.

(6) In the terminal of this embodiment, a subframe which is represented as a downlink subframe or a special subframe by the first parameter may not be used as an uplink subframe. A subframe represented as an uplink subframe or a special subframe by the second parameter may not be used as a downlink subframe.

(7) A base station of this embodiment which communicates with a terminal includes a reception unit which receives HARQ response information to transmission of a downlink-shared channel in one or more predetermined subframes transmitted based on resources of one or more uplink control channels. When a certain subframe in the predetermined subframes is a first subframe, a resource of an uplink control channel to a downlink-shared channel represented by detection of a physical downlink control channel in the certain subframe may be given by an arithmetic operation using at least an initial value of a control channel element for use in transmitting a physical downlink control channel in the certain subframe and a first value set by a higher layer. When a certain subframe in the predetermined subframes is a second subframe, a resource of an uplink control channel to a downlink-shared channel represented by detection of a physical downlink control channel in the certain subframe may be given by an arithmetic operation using at least an initial value of a control channel for use in transmitting a physical downlink control channel in the certain subframe and a second value set by a higher layer.

(8) A base station of this embodiment which communicates with a terminal includes a reception unit which receives HARQ response information to transmission of a downlink-shared channel in one or more predetermined subframes transmitted based on resources of one or more uplink control channels. When a certain subframe in the predetermined subframes is a first subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe. When a certain subframe in the predetermined subframes is a second subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe and the number of extended control channel elements in the first subframe.

(9) A communication method of this embodiment which is used in a terminal communicating with a base station includes a step of transmitting HARQ response information to transmission of a downlink-shared channel in one or more predetermined subframes based on resources of one or more uplink control channels. When a certain subframe in the predetermined subframes is a first subframe, a resource of an uplink control channel to a downlink-shared channel represented by detection of a physical downlink control channel in the certain subframe may be given by an arithmetic operation using at least an initial value of a control channel element for use in transmitting a physical downlink control channel in the certain subframe and a first value set by a higher layer. When a certain subframe in the predetermined subframes is a second subframe, a resource of an uplink control channel to a downlink-shared channel represented by detection of a physical downlink control channel in the certain subframe may be given by an arithmetic operation using at least an initial value of a control channel element for use in transmitting a physical downlink control channel in the certain subframe and a second value set by a higher layer.

(10) A communication method of this embodiment which is used in a terminal communicating with a base station includes a step of transmitting HARQ response information to transmission of a downlink-shared channel in one or more predetermined subframes based on resources of one or more uplink control channels. When a certain subframe in the predetermined subframes is a first subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe. When a certain subframe in the predetermined subframes is a second subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe and the number of extended control channel elements in the first subframe.

(11) A communication method of this embodiment which is used in a base station communicating with a terminal includes a step of receiving HARQ response information to transmission of a downlink-shared channel in one or more predetermined subframes transmitted based on resources of one or more uplink control channels. When a certain subframe in the predetermined subframes is a first subframe, a resource of an uplink control channel to a downlink-shared channel represented by detection of a physical downlink control channel in the certain subframe is given by an arithmetic operation using at least an initial value of a control channel element for use in transmitting a physical downlink control channel in the certain subframe and a first value set by a higher layer. When a certain subframe in the predetermined subframes is a second subframe, a resource of an uplink control channel to a downlink-shared channel represented by detection of a physical downlink control channel in the certain subframe may be given by an arithmetic operation using at least an initial value of a control channel for use in transmitting a physical downlink control channel in the certain subframe and a second value set by a higher layer.

(12) A communication method of this embodiment which is used in a base station communicating with a terminal includes a step of receiving HARQ response information to transmission of a downlink-shared channel in one or more predetermined subframes transmitted based on resources of one or more uplink control channels. When a certain subframe in the predetermined subframes is a first subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe. When a certain subframe in the predetermined subframes is a second subframe, a resource of an uplink control channel to a downlink-shared channel represented by detection of an extended physical downlink control channel in the certain subframe may be given by an arithmetic operation using at least an initial value of an extended control channel element for use in transmitting a physical downlink control channel in the certain subframe and the number of extended control channel elements in the first subframe.

Effects of the Invention

According to the embodiments of the invention, it is possible to improve transmission efficiency in a radio communication system where a base station and a terminal communicate with each other.

BRIEF DESCRIPTION OF THE DRAWINGS

FIG. 11 is an example of an uplink-downlink configuration.

FIG. 13 is a diagram showing an example of a subframe configuration and monitoring of control channels.

FIG. 14 is a diagram showing an example of a subframe configuration and monitoring of control channels.

FIG. 17 is a diagram showing an example of a subframe configuration and monitoring of control channels.

FIG. 18 is a diagram showing an example of a subframe configuration and monitoring of control channels.

FIG. 19 is a diagram showing an example of a subframe configuration and monitoring of control channels.

FIG. 20 is a diagram showing an example of a subframe configuration and monitoring of control channels.

FIG. 21 is a diagram showing an example of a subframe configuration and monitoring of control channels.

FIG. 22 is a diagram showing an example of a subframe configuration and monitoring of control channels.

MODE FOR CARRYING OUT THE INVENTION

Hereinafter, an embodiment of the invention will be described.

In this embodiment, a plurality of cells are set in a mobile station device. A technique in which the mobile station device performs communication through a plurality of cells is referred to as cell aggregation or carrier aggregation. The invention may be applied in each of a plurality of cells set in the mobile station device. The invention may be applied in some of a plurality of set cells. The cells set in the mobile station device are referred to as serving cells.

A plurality of set serving cells include one primary cell and one or a plurality of secondary cells. The primary cell is a serving cell where an initial connection establishment procedure is performed, a serving cell where a connection re-establishment procedure starts, or a cell which is indicated as a primary cell in a handover procedure. When or after an RRC connection is established, the secondary cells may be set.

A radio communication system of this embodiment uses a TDD (Time Division Duplex) system. In case of cell aggregation, the TDD system may be applied to all of a plurality of cells. In case of cell aggregation, cells where the TDD system is applied and cells where an FDD (Frequency Division Duplex) system is applied may be put together. When cells where TDD is applied and cells where FDD is applied are put together, the invention can be applied to cells where TDD is applied.

When a plurality of cells where TDD is applied are aggregated, a half-duplex TDD system or a full-duplex TDD system can be applied.

A mobile station device transmits, to a base station device, information representing combinations of bands where carrier aggregation is supported by the mobile station device. The mobile station device transmits, to the base station device, information indicating whether or not simultaneous transmission and reception in the plurality of serving cells in a plurality of different bands are supported for each combination of bands.

In this embodiment, "X/Y" includes the meaning of "X or Y". In this embodiment, "X/Y" includes the meaning of "X and Y". In this embodiment, "X/Y" includes the meaning of "X and/or Y".

Figure 1:
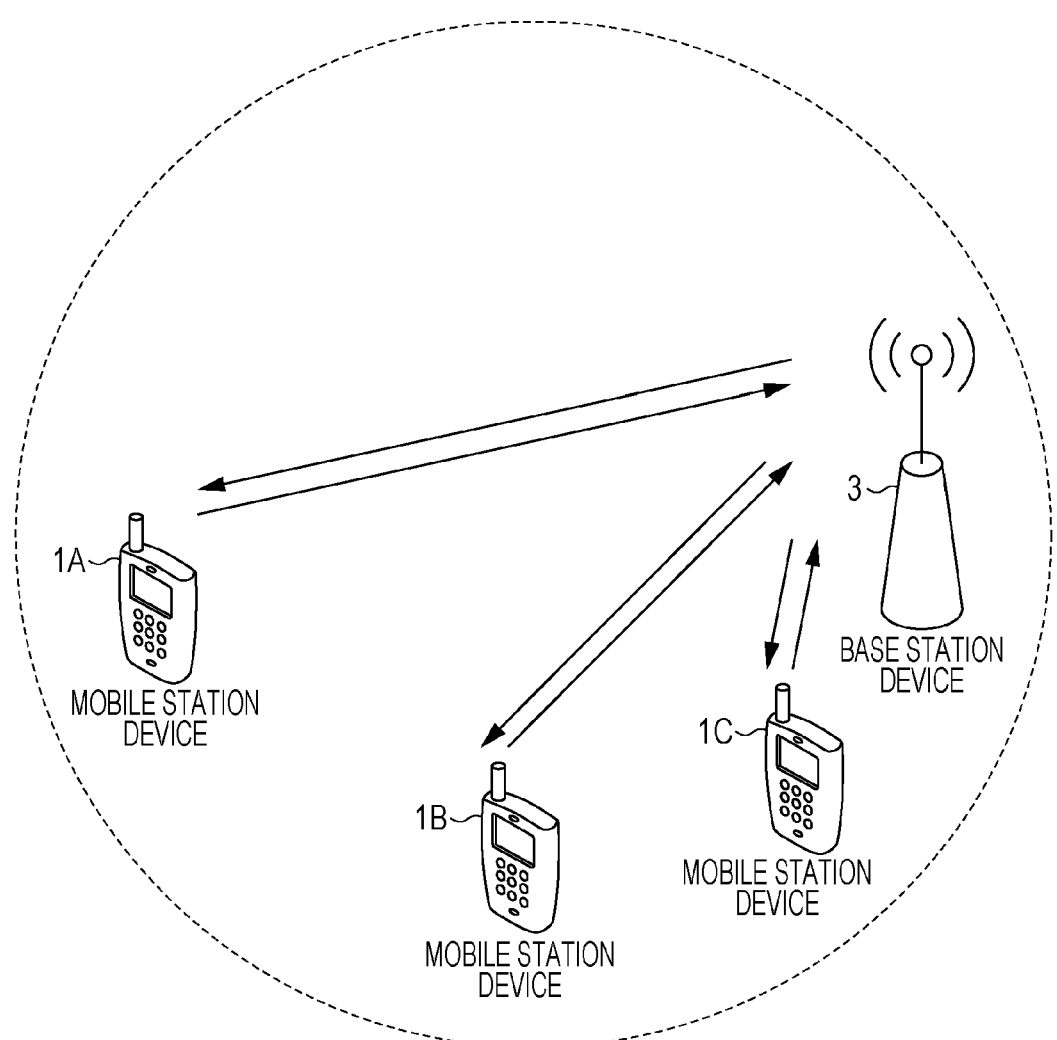
FIG. 1 is a conceptual diagram of a radio communication system of this embodiment.

FIG. 1 is a conceptual diagram of a radio communication system of this embodiment. In FIG. 1, the radio communication system includes mobile station devices 1A to 1C, and a base station device 3. Hereinafter, the mobile station devices 1A to 1C are referred to as mobile station devices 1.

Physical channels and physical signals of this embodiment will be described.

In FIG. 1, in radio communication of an uplink from the mobile station devices 1 to the base station device 3, uplink physical channels are used. The uplink physical channels can be used to transmit information output from a higher layer. The uplink physical channels include a PUCCH (Physical Uplink Control Channel), a PUSCH (Physical Uplink Shared Channel), a PRACH (Physical Random Access Channel), and the like.

The PUCCH is a physical channel which is used to transmit uplink control information (UCI). The uplink control information includes downlink channel state information (CSI), a scheduling request (SR) representing a request of a PUSCH resource, and ACK (acknowledgement)/NACK (negative-acknowledgement) to downlink data (Transport block, Downlink-Shared Channel: DL-SCH). ACK/NACK is referred to as HARQ-ACK, HARQ feedback, or response information.

The PUSCH is a physical channel which is used to transmit uplink data (Uplink-Shared Channel: UL-SCH). The PUSCH may be used to transmit HARQ-ACK and/or channel state information along with uplink data. The PUSCH may be used to transmit only channel state information, or may be used to transmit only HARQ-ACK and channel state information.

The PRACH is a physical channel which is used to transmit a random access preamble. The PRACH has a primary purpose of allowing the mobile station devices 1 to synchronize a time domain with the base station device 3. In addition, the PRACH is used to represent an initial connection establishment procedure, a handover procedure, a connection re-establishment procedure, synchronization to uplink transmission (timing adjustment), and a request of a PUSCH resource.

In FIG. 1, in radio transmission of an uplink, an uplink physical signal is used. The uplink physical signal includes an uplink reference signal (ULRS) or the like. As the uplink reference signal, a DMRS (Demodulation Reference Signal), a SRS (Sounding Reference Signal), or the like is used. The DMRS is related to the transmission of the PUSCH or the PUCCH. The DMRS is time-multiplexed on the PUSCH or the PUCCH. The base station device 3 uses the DMRS to correct the propagation path of the PUSCH or the PUCCH. Hereinafter, the transmission of both the PUSCH and the DMRS is simply referred to as the transmission of the PUSCH. Hereinafter, the transmission of both the PUCCH and the DMRS is simply referred to as the transmission of the PUCCH. The DMRS of the uplink is referred to as UL-DMRS. The SRS is not related to the transmission of the PUSCH or the PUCCH. The base station device 3 uses the SRS to measure the channel state of the uplink.

In FIG. 1, in radio communication of a downlink from the base station device 3 to the mobile station devices 1, downlink physical channels are used. The downlink physical channels can be used to transmit information output from a higher layer. The downlink physical channels include a PBCH (Physical Broadcast Channel), a PCFICH (Physical Control Format Indicator Channel), a PHICH (Physical Hybrid automatic repeat request Indicator Channel), a PDCCH (Physical Downlink Control Channel), an EPDCCH (Enhanced Physical Downlink Control Channel), a PDSCH (Physical Downlink Shared Channel), a PMCH (Physical Multicast Channel), and the like.

The PBCH is used to broadcast of a master information block (MIB, Broadcast Channel: BCH) to be commonly used in the mobile station devices 1. The MIB is updated at an interval of 40 ms. The PBCH is repeatedly transmitted in a period of 10 ms. Specifically, the initial transmission of the MIB is performed in a subframe 0 of radio frames satisfying SFN mod 4=0, and the retransmission (repetition) of the MIB is performed in a subframe 0 of all other radio frames. A SFN (system frame number) is the number of each radio frame. The MIB is system information. For example, the MIB includes information representing the SFN.

The PCFICH is used to transmit information indicating a region (OFDM symbol) for use in transmitting the PDCCH.

The PHICH is used to transmit a HARQ indicator (HARQ feedback, response information) representing ACK (ACKnowledgement) or NACK (Negative ACKnowledgement) to uplink data (Uplink Shared Channel: UL-SCH) received by the base station device 3. For example, when the mobile station devices 1 receive a HARQ indicator representing ACK, corresponding uplink data is not retransmitted. For example, when the mobile station devices 1 receive a HARQ indicator representing NACK, corresponding uplink data is retransmitted. A single PHICH transmits a HARQ indicator to single piece of uplink data. The base station device 3 transmits HARQ indicators to a plurality of pieces of uplink data included in the same PUSCH using a plurality of PHICHs.

The PDCCH and EPDCCH are used to transmit downlink control information (DCI). The downlink control information is referred to as a DCI format. The downlink control information includes a downlink grant and an uplink grant. The downlink grant is referred to as downlink assignment or downlink allocation.

The downlink grant is used for scheduling of a signal PDSCH in a single cell. The downlink grant is used for scheduling of the PDSCH in the same subframe as a subframe where the downlink grant is transmitted. The uplink grant is used for scheduling of a single PUSCH in a single cell. The uplink grant is used for scheduling of a single PUSCH in four or more subframes after a subframe where the uplink grant is transmitted.

The DCI format is appended with a CRC (Cyclic Redundancy Check) parity bit. The CRC parity bit is scrambled by a C-RNTI (Cell-Radio Network Temporary Identifier) or a SPS C-RNTI (Semi Persistent Scheduling Cell-Radio Network Temporary Identifier). The C-RNTI and the SPS C-RNTI are identifiers for identifying a mobile station device in a cell. The C-RNTI is used to control the PDSCH or the PUSCH in a single subframe. The SPS C-RNTI is used to allocate the resource of the PDSCH or the PUSCH cyclically.

The PDSCH is used to transmit downlink data (Downlink Shared Channel: DL-SCH).

The PMCH is used to transmit multicast data (Multicast Channel: MCH).

In FIG. 1, in the radio communication of the downlink, the following downlink physical signals are used. The downlink physical signals include a synchronization signal (SS), a downlink reference signal (DL RS), and the like.

The synchronization signal is used when the mobile station devices 1 synchronize the frequency domain and the time domain of the downlink. The synchronization signal is mapped in predetermined subframes of a radio frame. For example, in the TDD system, the synchronization signal is mapped in subframes 0, 1, 5, and 6 of a radio frame. In the FDD, the synchronization signal is mapped in subframes 0 and 5 of a radio frame.

The downlink reference signal is used when the mobile station devices 1 correct the propagation path of the downlink physical channels. The downlink reference signal is used when the mobile station devices 1 calculate channel state information of the downlink. The downlink reference signal is used when the mobile station devices 1 measure the geographical positions thereof.

The downlink reference signal includes a CRS (Cell-specific Reference Signal), a URS (UE-specific Reference Signal) related to the PDSCH, a DMRS (Demodulation Reference Signal) related to the EPDCCH, NZP CSI-RS (Non-Zero Power Chanel State Information—Reference Signal), ZP CSI-RS (Zero Power Chanel State Information—Reference Signal), a MBSFN RS (Multimedia Broadcast and Multicast Service over Single Frequency Network Reference signal), a PRS (Positioning Reference Signal), a TRS (Tracking Reference Signal), and the like.

The CRS is transmitted in the entire band of a subframe. The CRS is used to demodulate the PBCH/PDCCH/PHICH/PCFICH/PDSCH. The CRS may be used when the mobile station devices 1 calculate the channel state information of the downlink. The PBCH/PDCCH/PHICH/PCFICH is transmitted through an antenna port for use in transmitting the CRS.

The URS related to the PDSCH is transmitted in a subframe and a band for use in transmitting the PDSCH to which the URS is related. The URS is used to demodulate the PDSCH to which the URS is related.

The PDSCH is transmitted through an antenna port for use in transmitting the CRS or the URS. A DCI format 1A is used for scheduling of the PDSCH which is transmitted through an antenna port for use in transmitting the CRS. A DCI format 2D is used for scheduling of the PDSCH which is transmitted through an antenna port for use in transmitting the URS.

The DMRS related to the EPDCCH is transmitted in a subframe and a band for use in transmitting the EPDCCH to which the DMRS is related. The DMRS is used to demodulate the EPDCCH to which the DMRS is related. The EPDCCH is transmitted through an antenna port for use in transmitting the DMRS.

The NZP CSI-RS is transmitted in a set subframe. A resource where the NZPCSI-RS is transmitted is set by the base station device. The NZPCSI-RS is used when the mobile station devices 1 calculate the channel state information of the downlink. The mobile station devices 1 perform signal measurement (channel measurement) using the NZP CSI-RS.

The resource of the ZP CSI-RS is set by the base station device 3. The base station device 3 transmits the ZP CSI-RS with zero output. That is, the base station device 3 does not transmit the ZP CSI-RS. The base station device 3 does not transmit the PDSCH and the EPDCCH in the set resource of the ZP CSI-RS. For example, the mobile station devices 1 can measure interference in a resource, to which the NZP CSI-RS corresponds, in a certain cell.

The MBSFN RS is transmitted in the entire band of a subframe for use in transmitting the PMCH. The MBSFN RS is used to demodulate the PMCH. The PMCH is transmitted through an antenna port for use in transmitting the MBSFN RS.

The PRS is used when the mobile station devices measure the geographical positions thereof.

The TRS can be mapped to predetermined subframes. For example, the TRS is mapped to subframes 0 and 5. The TRS can use the same configuration as a part of the CRS. For example, in each of resource blocks, the position of a resource element to which the TRS is mapped can be the same as the position of a resource element to which a CRS of an antenna port 0 is mapped. A sequence (value) which is used for the TRS can be determined based on information set through the PBCH, the PDCCH, the EPDCCH, or the PDSCH (RRC signaling). A sequence (value) which is used for the TRS can be determined based on parameters, such as a cell ID (for example, a physical layer cell identifier) and a slot number. A sequence (value) which is used for the TRS can be determined by a method different from a sequence (value) which is used for the CRS of the antenna port 0.

The downlink physical channels and the downlink physical signal are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. Channels which are used in a medium access control (MAC) layer are referred to as transport channels. A unit of a transport channel which is used in the MAC layer is referred to as a transport block (TB) or a MAC PDU (Protocol Data Unit). Control of a HARQ (Hybrid Automatic Repeat reQuest) is performed for each transport block in the MAC layer. The transport block is a unit of data which is delivered to a physical layer by the MAC layer. In the physical layer, the transport block is mapped to a code word, and encoding is performed for each code word.

Hereinafter, the configuration of a radio frame of this embodiment will be described.

Figure 2:
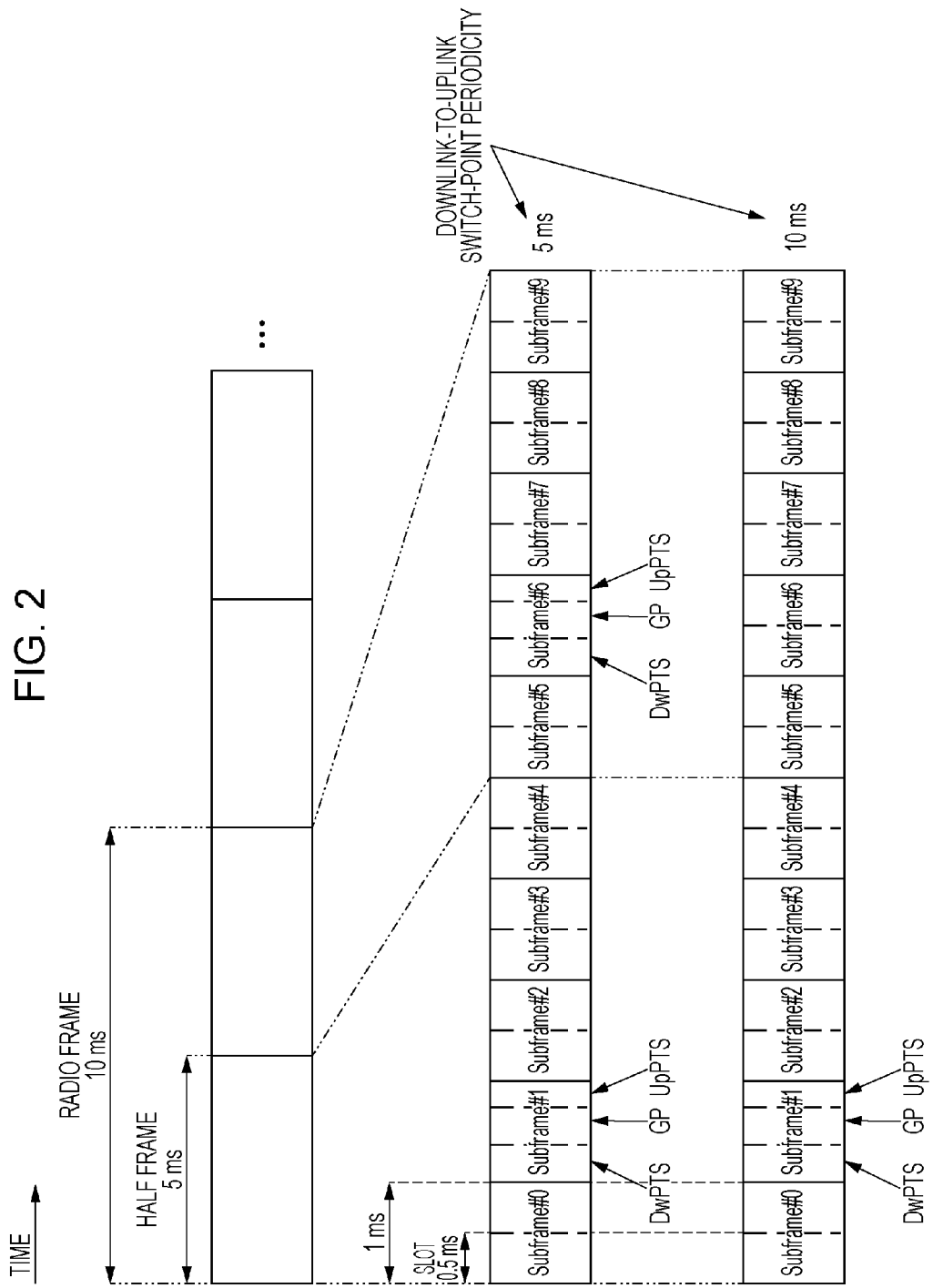
FIG. 2 is a diagram showing the schematic configuration of a radio frame of this embodiment.

FIG. 2 is a diagram showing the schematic configuration of a radio frame of this embodiment. Each radio frame has a length of 10 ms. In FIG. 2, the horizontal axis is a time axis. Each radio frame has two half frames. Each half frame has a length of 5 ms. Each half frame has five subframes. Each subframe has a length of 1 ms and is defined by two consecutive slots. Each slot has a length of 0.5 ms. An i-th subframe in a radio frame has a (2×i)th slot and a (2×i+1)th slot. That is, ten subframes can be used at each internal of 10 ms.

The subframes include a downlink subframe (first subframe), an uplink subframe (second subframe), a special subframe (third subframe), and the like.

The downlink subframe is a subframe which is reserved for downlink transmission. The uplink subframe is a subframe which is reserved for uplink transmission. The special subframe has three fields. The three fields are a DwPTS (Downlink Pilot Time Slot), a GP (Guard Period), and an UpPTS (Uplink Pilot Time Slot). The total length of the DwPTS, the GP, and the UpPTS is 1 ms. The DwPTS is a field which is reserved for downlink transmission. The UpPTS is a field which is reserved for uplink transmission. The GP is a field where downlink transmission and uplink transmission are not performed. The special subframe may have only the DwPTS and the GP or may have only the GP and the UpPTS.

A single radio frame has at least a downlink subframe, an uplink subframe, and a special subframe.

The radio communication system of this embodiment supports downlink-to-uplink switch-point periodicity of 5 ms and 10 ms. When the downlink-to-uplink switch-point periodicity is 5 ms, a special subframe is included in both half frames in a radio frame. When the downlink-to-uplink switch-point periodicity is 10 ms, a special subframe is included in only the first half frame of a radio frame.

Hereinafter, the configuration of a slot of this embodiment will be described.

Figure 3:
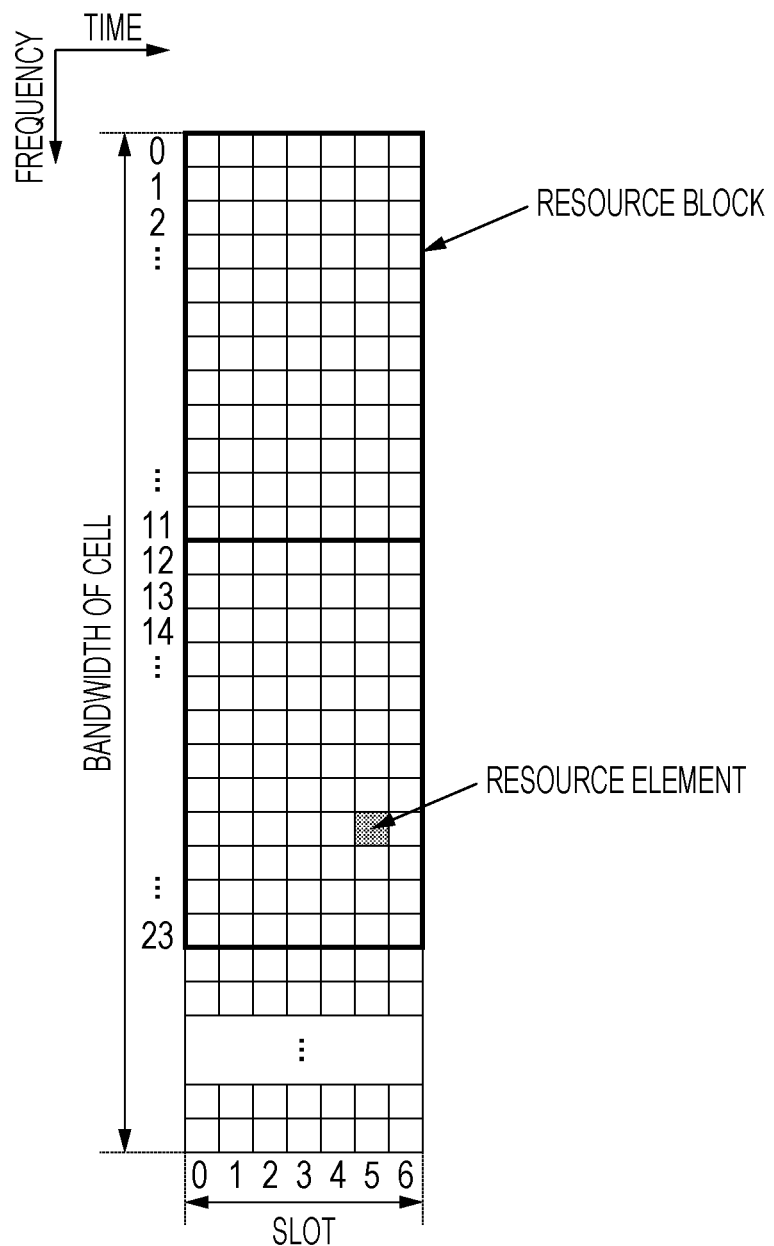
FIG. 3 is a diagram showing the configuration of a slot of this embodiment.

FIG. 3 is a diagram showing the configuration of a slot of this embodiment. In this embodiment, a normal CP (normal Cyclic Prefix) is applied to an OFDM symbol. An extended CP (extended Cyclic Prefix) may be applied to an OFDM symbol. A physical signal or a physical channel which is transmitted in each slot is expressed by a resource grid. In the downlink, a resource grid is defined by a plurality of subcarriers with respect to a frequency direction and a plurality of OFDM symbols with respect to a time direction. In the uplink, a resource grid is defined by a plurality of subcarriers with respect to a frequency direction and a plurality of SC-FDMA symbols with respect to a time direction. The number of subcarriers or resource blocks depends on a bandwidth of a cell. The number of OFDM symbols or SC-FDMA symbols of one slot is 7 on the normal CP and 6 on the extended CP. Each element in a resource grid is referred to as a resource element. A resource element is identified using the number of a subcarrier and the number of an OFDM symbol or SC-FDMA symbol.

A resource block is used for mapping to a resource element of a certain physical channel (PDSCH or PUSCH). In the resource block, a virtual resource block and a physical resource block are defined. A certain physical channel is first mapped to the virtual resource block. Thereafter, the virtual resource block is mapped to the physical resource block. One physical resource block is defined from seven continuous OFDM symbols or SC-FDMA symbols in a time domain and twelve contiguous subcarriers in a frequency domain. Therefore, one physical resource block has (7×12) resource elements. Furthermore, one physical resource block corresponds to one slot in the time domain, and corresponds to 180 kHz in the frequency domain. The physical resource block is numbered from 0 in the frequency domain. Moreover, two resource blocks in one subframe to which the same physical resource block number corresponds are defined as a physical resource block pair (PRB pair, RB pair).

Hereinafter, a physical channel and a physical signal which are transmitted in each subframe will be described.

Figure 4:
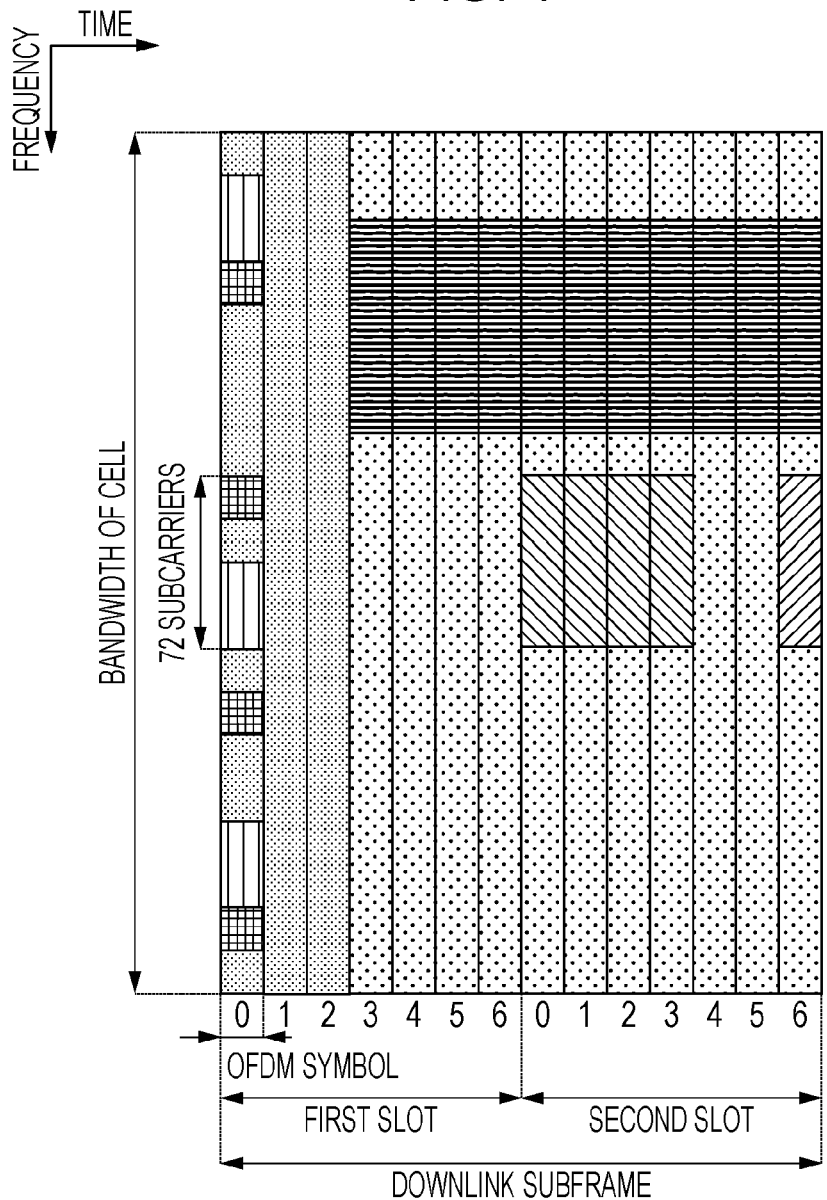
FIG. 4 is a diagram showing an example of the mapping of physical channels and physical signals in a downlink subframe of this embodiment.

FIG. 4 is a diagram showing an example of the mapping of physical channels and physical signals in the downlink subframe of this embodiment. The base station device 3 can transmit the downlink physical channels (PBCH, PCFICH, PHICH, PDCCH, EPDCCH, PDSCH) and/or the downlink physical signals (synchronization signal, downlink reference signal) in the downlink subframe. The PBCH is transmitted in only the subframe 0 of the radio frame. The downlink reference signal is mapped in the resource elements distributed in the frequency domain and the time domain. For simplification of description, the downlink reference signal is not shown in FIG. 4.

In a PDCCH region, a plurality of PDCCHs may be frequency, time, and/or space-multiplexed. In an EPDCCH region, a plurality of EPDCCHs may be frequency, time, and/or space-multiplexed. In a PDSCH region, a plurality of PDSCHs may be frequency, time, and/or space-multiplexed. The PDCCH, the PDSCH, and/or the EPDCCH may be frequency, time, and/or space-multiplexed.

Figure 5:
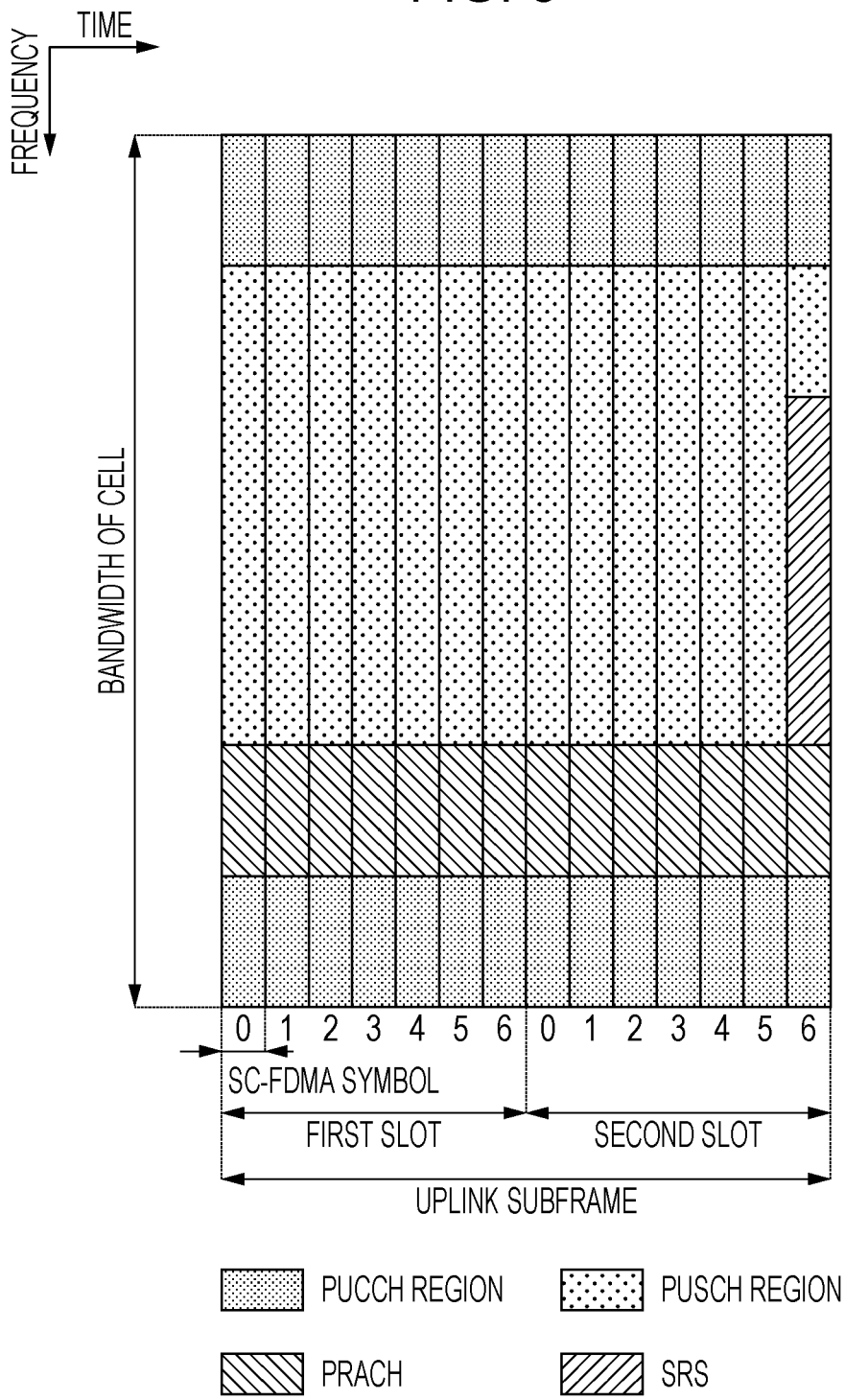
FIG. 5 is a diagram showing an example of the mapping of physical channels and physical signals in an uplink subframe of this embodiment.

FIG. 5 is a diagram showing an example of the mapping of physical channels and physical signals in an uplink subframe of this embodiment. The mobile station devices 1 may transmit the uplink physical channels (PUCCH, PUSCH, PRACH) and the uplink physical signals (UL-DMRS, SRS) in the uplink subframe. In a PUCCH region, a plurality of PUCCHs are frequency, time, space, and/or code-multiplexed. In a PUSCH region, a plurality of PUSCHs are frequency, time, space, and/or code-multiplexed. The PUCCH and the PUSCH may be frequency, time, space, and/or code-multiplexed. The PRACH may be allocated over a single subframe or two subframes. A plurality of PRACHs may be code-multiplexed.

The SRS is transmitted using the last SC-FDMA symbol in the uplink subframe. That is, the SRS is mapped in the last SC-FDMA symbol in the uplink subframe. The mobile station devices 1 can limit simultaneous transmission of the SRS and the PUCCH/PUSCH/PRACH in a single SC-FDMA symbol of a single cell. In a single uplink subframe of a single cell, the mobile station devices 1 can transmit the PUSCH and/or the PUCCH using SC-FDMA symbols excluding the last SC-FDMA symbol in the uplink subframe and can transmit the SRS using the last SC-FDMA symbol in the uplink subframe. That is, the mobile station devices 1 can transmit the SRS, and the PUSCH and the PUCCH in the single uplink subframe in the single cell. The DMRS is time-multiplexed on the PUCCH or the PUSCH. For simplification of description, the DMRS is not shown in FIG. 5.

Figure 6:
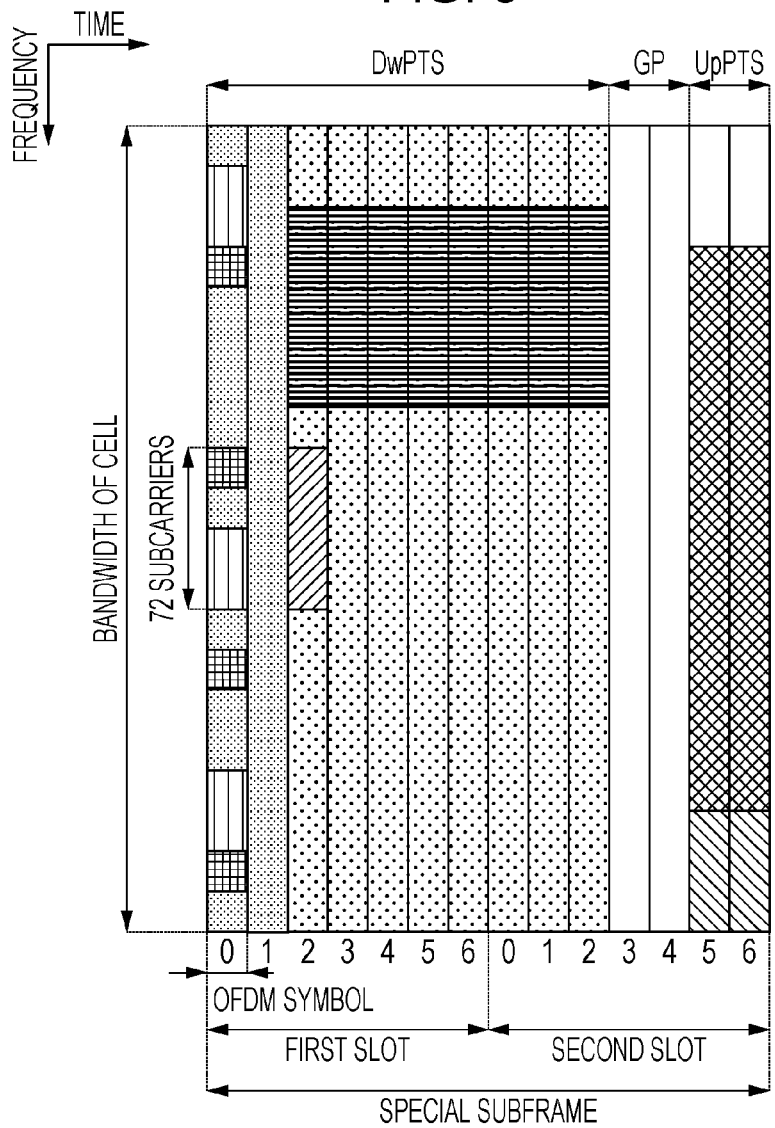
FIG. 6 is a diagram showing an example of the mapping of physical channels and physical signals in a special subframe of this embodiment.

FIG. 6 is a diagram showing an example of the mapping of physical channels and physical signals in a special subframe of this embodiment. In FIG. 6, the DwPTS has the first to tenth SC-FDMA symbols in the special subframe, the GP has the eleventh and twelfth SC-FDMA symbols in the special subframe, and the UpPTS has the thirteenth and fourteenth SC-FDMA symbols in the special subframe.

The base station device 3 may transmit the PCFICH, the PHICH, the PDCCH, the EPDCCH, the PDSCH, the synchronization signal, and the downlink reference signal in the DwPTS of the special subframe. The base station device 3 can limit the transmission of the PBCH in the DwPTS of the special subframe. The mobile station devices 1 may transmit the PRACH and the SRS in the UpPTS of the special subframe. That is, the mobile station devices 1 can limit the transmission of the PUCCH, the PUSCH, and the DMRS in the UpPTS of the special subframe.

Figure 7:
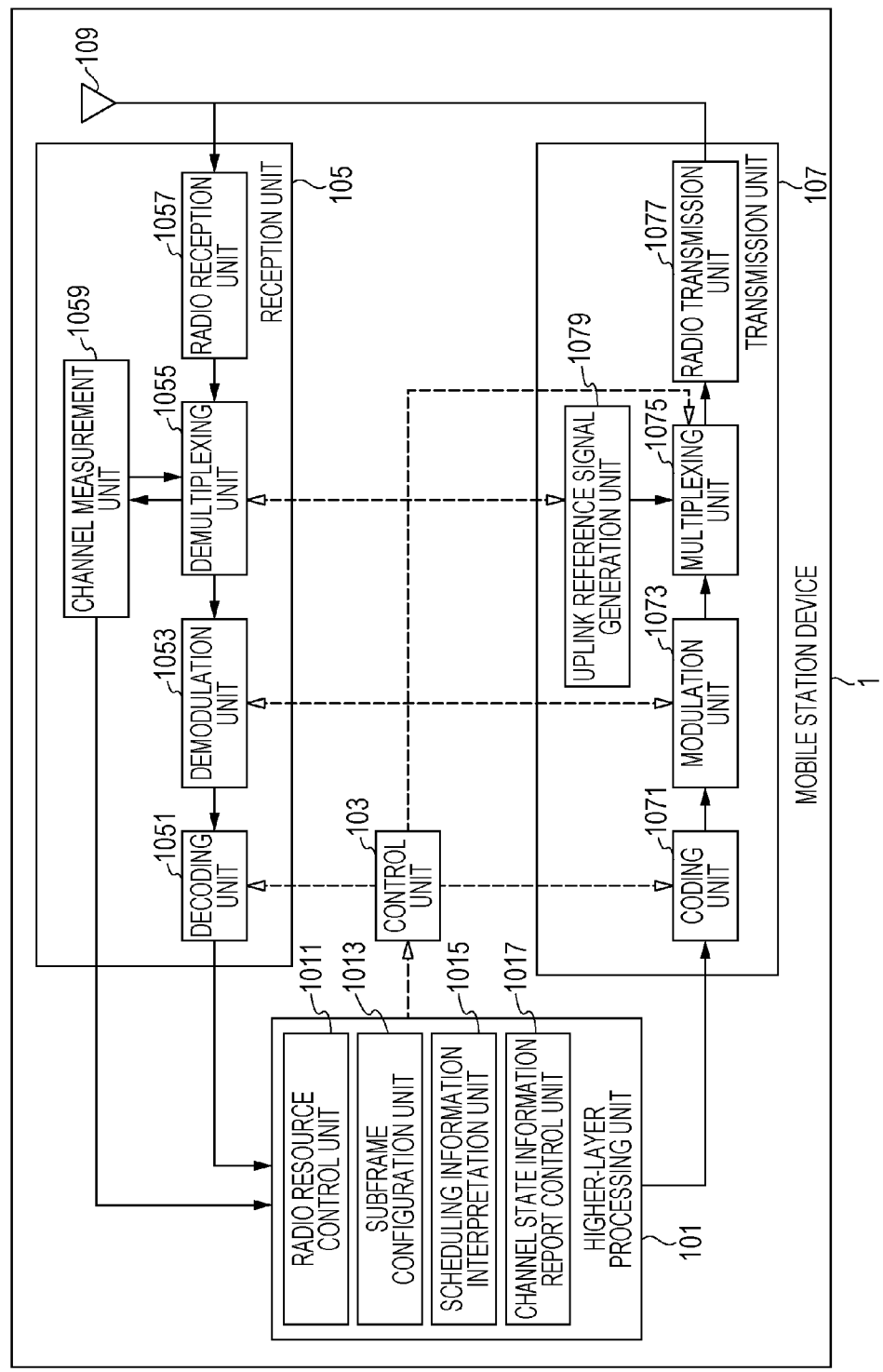
FIG. 7 is a schematic block diagram showing the configuration of a mobile station device 1 of this embodiment.

FIG. 7 is a schematic block diagram showing the configuration of a mobile station device 1 of this embodiment. As shown in the drawing, the mobile station device 1 includes an upper-layer processing unit 101, a control unit 103, a reception unit 105, a transmission unit 107, and a transmission/reception antenna 109. The upper-layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The upper-layer processing unit 101 outputs uplink data (transport block) generated by user's operation to the transmission unit 107. The upper-layer processing unit 101 performs processing of a medium access control (MAC) layer, a packet data convergence protocol (PDCP) layer, a radio link control (RLC) layer, and a radio resource control (RRC) layer.

The radio resource control unit 1011 in the upper-layer processing unit 101 manages various kinds of configuration information of the mobile station device. The radio resource control unit 1011 generates information to be mapped in each channel of the uplink and outputs the generated information to the transmission unit 107.

The subframe configuration unit 1013 in the upper-layer processing unit 101 manages a subframe configuration in the base station device 3 and/or a base station device different from the base station device 3 based on information set by the base station device 3. For example, the subframe configuration is the configuration of the uplink or downlink for a subframe. The subframe configuration includes a subframe pattern configuration, an uplink-downlink configuration, an uplink reference UL-DL configuration (Uplink reference configuration), a downlink reference UL-DL configuration (Downlink reference configuration), and/or a transmission direction UL-DL configuration (transmission direction configuration). The subframe configuration unit 1013 sets the subframe configuration, the subframe pattern configuration, the uplink-downlink configuration, the uplink reference UL-DL configuration, the downlink reference UL-DL configuration, and/or the transmission direction UL-DL configuration. The subframe configuration unit 1013 can set at least two subframe sets. The subframe pattern configuration includes an EPDCCH subframe configuration. The subframe configuration unit 1013 is referred to as a terminal subframe configuration unit.

The scheduling information interpretation unit 1015 in the upper-layer processing unit 101 interprets the DCI format (scheduling information) received through the reception unit 105, generates control information to control the reception unit 105 and the transmission unit 107 based on the interpretation result of the DCI format, and outputs the generated control information to the control unit 103.

The scheduling information interpretation unit 1015 determines the timing of transmission processing and reception processing based on the subframe configuration, the subframe pattern configuration, the uplink-downlink configuration, the uplink reference UL-DL configuration, the downlink reference UL-DL configuration, and/or the transmission direction UL-DL configuration.

The CSI report control unit 1017 specifies a CSI reference resource. The CSI report control unit 1017 instructs the channel measurement unit 1059 to derive a CQI related to the CSI reference resource. The CSI report control unit 1017 instructs the transmission unit 107 to transmit the CQI. The CSI report control unit 1017 sets a configuration which is used when the channel measurement unit 1059 calculates the CQI.

The control unit 103 generates control signals to control the reception unit 105 and the transmission unit 107 based on the control information from the upper-layer processing unit 101. The control unit 103 outputs the generated control signals to the reception unit 105 and the transmission unit 107 to control the reception unit 105 and the transmission unit 107.

The reception unit 105 separates, demodulates, and decodes reception signals received from the base station device 3 by the transmission/reception antenna 109 based on the control signals input from the control unit 103. The reception unit 105 outputs the decoded information to the upper-layer processing unit 101.

The radio reception unit 1057 converts the signals of the downlink received by the transmission/reception antenna 109 to an intermediate frequency (down covert), removes unnecessary frequency components, controls an amplification level such that the signal levels are appropriately maintained, performs quadrature demodulation based on the in-phase components and quadrature components of the received signals, and converts the quadrature-demodulated analog signals to digital signals. The radio reception unit 1057 removes a portion corresponding to a guard interval (GI) from the converted digital signals, performs fast Fourier transform (FFT) on the signals with the guard interval removed, and extracts the signals of the frequency domain.

The demultiplexing unit 1055 separates the PHICH, the PDCCH, the EPDCCH, the PDSCH, and/or the downlink reference signal from the extracted signals. The demultiplexing unit 1055 compensates for the propagation path of the PHICH, the PDCCH, the EPDCCH, and/or the PDSCH from an estimation value of the propagation path input from the channel measurement unit 1059. The demultiplexing unit 1055 outputs the separated downlink reference signal to the channel measurement unit 1059.

The demodulation unit 1053 synthesizes the signals by multiplying the PHICH by a corresponding code, performs demodulation according to a BPSK (Binary Phase Shift Keying) modulation system on the synthesized signals, and outputs the demodulation result to the decoding unit 1051. The decoding unit 1051 decodes the PHICH addressed to the mobile station device and outputs the decoded HARQ indicator to the upper-layer processing unit 101. The demodulation unit 1053 performs demodulation according to a QPSK modulation system on the PDCCH and/or the EPDCCH and outputs the demodulation result to the decoding unit 1051. The decoding unit 1051 attempts to decode the PDCCH and/or the EPDCCH, and when decoding is successful, outputs the decoded downlink control information and the RNTI, to which the downlink control information corresponds, to the upper-layer processing unit 101.

The demodulation unit 1053 performs demodulation according to a modulation system notified by the downlink grant, such as QPSK (Quadrature Phase Shift Keying), 16QAM (Quadrature Amplitude Modulation), or 64QAM, on the PDSCH and outputs the demodulation result to the decoding unit 1051. The decoding unit 1051 performs decoding based on information concerning an encoding rate notified by the downlink control information and outputs the decoded downlink data (transport block) to the upper-layer processing unit 101.

The channel measurement unit 1059 measures a path loss or a channel state of the downlink from the downlink reference signal input from the demultiplexing unit 1055 and outputs the measured path loss or the measured state of the channel to the upper-layer processing unit 101. The channel measurement unit 1059 calculates an estimation value of the propagation path of the downlink from the downlink reference signal and outputs the estimation value to the demultiplexing unit 1055. The channel measurement unit 1059 performs channel measurement and/or interference measurement to calculate the CQI.

The transmission unit 107 generates the uplink reference signal according to the control signals from the control unit 103, encodes and modulates uplink data (transport block) input from the upper-layer processing unit 101, multiplexes the PUCCH, PUSCH, and the generated uplink reference signal, and transmits the multiplexed signals to the base station device 3 through the transmission/reception antenna 109.

The coding unit 1071 performs encoding, such as convolution encoding or block encoding, on the uplink control information input from the upper-layer processing unit 101. The coding unit 1071 performs turbo encoding based on information which is used for the scheduling of the PUSCH.

The modulation unit 1073 modulates an encoding bit input from the coding unit 1071 by a modulation system notified by the downlink control information, such as BPSK, QPSK, 16QAM, or 64QAM, or a modulation system determined in advance for each channel. The modulation unit 1073 determines the number of sequences of data to be space-multiplexed based on information which is used for the scheduling of the PUSCH, and maps a plurality of pieces of uplink data transmitted by the same PUSCH to a plurality of sequences and performs precoding on the sequences using MIMO SM (Multiple Input Multiple Output Spatial Multiplexing).

The uplink reference signal generation unit 1079 generates a sequence obtained by a rule (expression) determined in advance based on a physical layer cell identifier (physical cell identity: PCI, referred to as a cell ID or the like) for identifying the base station device 3, a bandwidth where the uplink reference signal is allocated, a cyclic shift notified by the uplink grant, the values of parameters for generation of a DMRS sequence, and the like. The multiplexing unit 1075 rearranges the modulation symbols of the PUSCH in parallel according to the control signals input from the control unit 103 and then performs discrete Fourier transform (DFT). The multiplexing unit 1075 multiplexes the signals of the PUCCH and the PUSCH and the generated uplink reference signal for each transmission antenna port. That is, the multiplexing unit 1075 maps the signals of the PUCCH and the PUSCH and the generated uplink reference signal in the resource elements for each transmission antenna port.

The radio transmission unit 1077 performs inverse fast Fourier transform (IFFT) on the multiplexed signals, performs modulation according to a SC-FDMA system, appends a guard interval to SC-FDMA modulated SC-FDMA symbols, generates baseband digital signals, converts the baseband digital signals to analog signals, generates in-phase components and quadrature components having an intermediate frequency from the analog signals, removes excessive frequency components for the intermediate frequency band, converts signals having an intermediate frequency to signals having a high frequency (up convert), removes excessive frequency components, performs power amplification, and outputs and transmits the power-amplified signals to the transmission/reception antenna 109.

Figure 8:
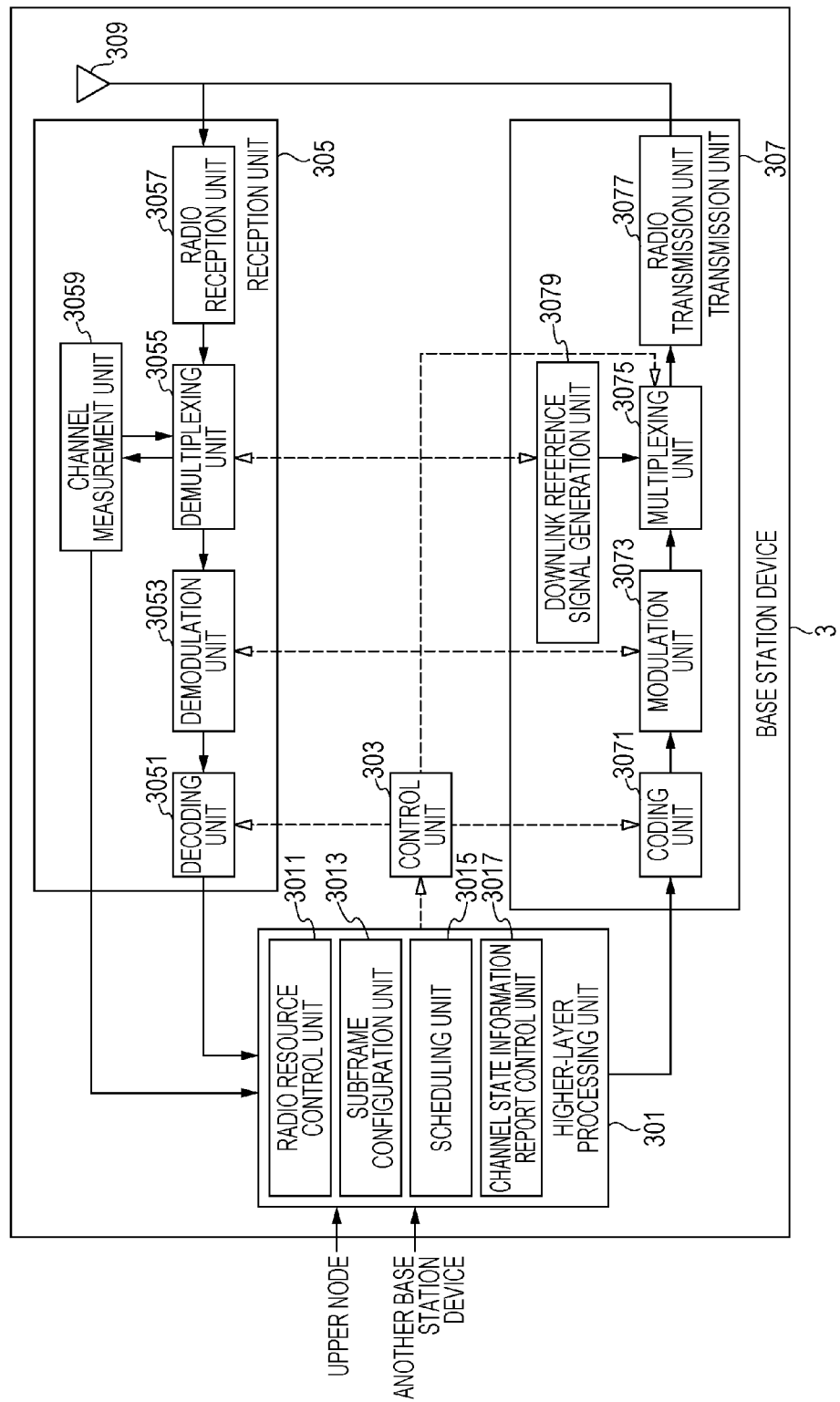
FIG. 8 is a schematic block diagram showing the configuration of a base station device 3 of this embodiment.

FIG. 8 is a schematic block diagram showing the configuration of a base station device 3 of this embodiment. As shown in the drawing, the base station device 3 includes an upper-layer processing unit 301, a control unit 303, a reception unit 305, a transmission unit 307, and a transmission/reception antenna 309. The upper-layer processing unit 301 includes a radio resource control unit 3011, a subframe configuration unit 3013, a scheduling unit 3015, and a CSI report control unit 3017. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The upper-layer processing unit 301 performs processing of the medium access control (MAC) layer, the packet data convergence protocol (PDCP) layer, the radio link control (RLC) layer, and the radio resource control (RRC) layer. The upper-layer processing unit 301 generates control information to control the reception unit 305 and the transmission unit 307 and outputs the generated control information to the control unit 303.

The radio resource control unit 3011 in the upper-layer processing unit 301 generates downlink data (transport block) arranged in the PDSCH of the downlink, system information, an RRC message, a MAC CE (Control Element), and the like, or acquires downlink data, the system information, the RRC message, and the MAC CE (Control Element) from an upper node, and outputs downlink data, the system information, the RRC message, and the MAC CE (Control Element) to the transmission unit 307. The radio resource control unit 3011 manages various kinds of configuration information of each of the mobile station devices 1.

The subframe configuration unit 3013 in the upper-layer processing unit 301 manages the subframe configuration, the subframe pattern configuration, the uplink-downlink configuration, the uplink reference UL-DL configuration, the downlink reference UL-DL configuration, and/or the transmission direction UL-DL configuration for each mobile station device 1. The subframe configuration unit 3013 sets the subframe configuration, the subframe pattern configuration, the uplink-downlink configuration, the uplink reference UL-DL configuration, the downlink reference UL-DL configuration, and/or the transmission direction UL-DL configuration for each mobile station device 1. The subframe configuration unit 3013 transmits information concerning the subframe configuration to the mobile station devices 1. The subframe configuration unit 3013 is referred to as a base station subframe configuration unit.

The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the mobile station devices 1. The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the mobile station devices 1 indicated from the upper node.

For example, the subframe configuration unit 3013 may determine the subframe configuration, the subframe pattern configuration, the uplink-downlink configuration, the uplink reference UL-DL configuration, the downlink reference UL-DL configuration, and/or the transmission direction UL-DL configuration based on the traffic amount of the uplink and the traffic amount of the downlink.

The subframe configuration unit 3013 can manage at least two subframe sets. The subframe configuration unit 3013 may set at least two subframe sets for each mobile station device 1. The subframe configuration unit 3013 may set at least two subframe sets for each serving cell. The subframe configuration unit 3013 may set at least two subframe sets for each CSI process. The subframe configuration unit 3013 can transmit information representing at least two subframe sets to the mobile station devices 1 through the transmission unit 307.

The scheduling unit 3015 in the upper-layer processing unit 301 determines the frequency and subframe to which the physical channels (PDSCH and PUSCH) are allocated, the encoding rate and the modulation system of the physical channels (PDSCH and PUSCH), transmission power, and the like from the channel state information, the estimation value of the propagation path or the channel quality input from the channel measurement unit 3059, and the like. The scheduling unit 3015 determines whether or not to schedule the downlink physical channels and/or the downlink physical signals or the uplink physical channels and/or the uplink physical signals in a flexible subframe. The scheduling unit 3015 generates control information (for example, DCI format) to control the reception unit 305 and the transmission unit 307 based on the scheduling result and outputs the generated control information to the control unit 303.

The scheduling unit 3015 generates information, which is used for the scheduling of the physical channels (PDSCH and PUSCH), based on the scheduling result. The scheduling unit 3015 determines the timing (subframe) of transmission processing and reception processing based on the UL-DL configuration, the subframe pattern configuration, the uplink-downlink configuration, the uplink reference UL-DL configuration, the downlink reference UL-DL configuration, and/or the transmission direction UL-DL configuration.

The CSI report control unit 3017 in the upper-layer processing unit 301 controls a CSI report of the mobile station device 1. The CSI report control unit 3017 transmits information representing various configurations, which are assumed when the mobile station device 1 derives a CQI in a CSI reference resource, to the mobile station device 1 through the transmission unit 307.

The control unit 303 generates control signals to control the reception unit 305 and the transmission unit 307 based on the control information from the upper-layer processing unit 301. The control unit 303 outputs the generated control signals to the reception unit 305 and the transmission unit 307 to control the reception unit 305 and the transmission unit 307.

The reception unit 305 separates, demodulates, and decodes reception signals received from the mobile station devices 1 through the transmission/reception antenna 309 according to the control signals input from the control unit 303 and outputs the decoded information to the upper-layer processing unit 301. The radio reception unit 3057 converts the signals of the uplink received through the transmission/reception antenna 309 to an intermediate frequency (down covert), removes unnecessary frequency components, controls an amplification level such that the signal levels are appropriately maintained, performs quadrature demodulation based on the in-phase components and the quadrature components of the received signals, and converts the quadrature-demodulated analog signals to digital signals.

The radio reception unit 3057 removes a portion corresponding to the guard interval (GI) from the converted digital signals. The radio reception unit 3057 performs fast Fourier transform (FFT) on the signals with the guard interval removed, extracts the signals of the frequency domain, and outputs the extracted signals to the demultiplexing unit 3055.

The demultiplexing unit 1055 separates the signals input from the radio reception unit 3057 into the PUCCH, the PUSCH, the uplink reference signal, and the like. The separation is performed based on allocation information of radio resources included in the uplink grant determined by the radio resource control unit 3011 of the base station device 3 and notified to each mobile station device 1. The demultiplexing unit 3055 compensates for the propagation path of the PUCCH and the PUSCH from the estimation value of the propagation input from the channel measurement unit 3059. The demultiplexing unit 3055 outputs the separated uplink reference signal to the channel measurement unit 3059.

The demodulation unit 3053 performs inverse discrete Fourier transform (IDFT) on the PUSCH, acquires the modulation symbols, and demodulates the reception signals using a modulation system determined in advance, such as BPSK (Binary Phase Shift Keying), QPSK, 16QAM, or 64QAM, or a modulation system notified in advance from the base station device to each of the mobile station devices 1 by the uplink grant on each of the modulation symbols of the PUCCH and the PUSCH. The demodulation unit 3053 separates the modulation symbols of a plurality of pieces of uplink data transmitted in the same PUSCH using MIMO SM based on the number of sequences to be space-multiplexed notified in advance to each of the mobile station devices 1 by the uplink grant and information indicating precoding on the sequences.

The decoding unit 3051 decodes the encoding bits of the demodulated PUCCH and PUSCH at an encoding rate determined in advance of an encoding system determined in advance or an encoding rate notified in advance from the base station device to each of the mobile station devices 1 by the uplink grant and outputs the decoded uplink data and the uplink control information to the upper-layer processing unit 101. When retransmitting the PUSCH, the decoding unit 3051 decodes an encoding bit held in a HARQ buffer input from the upper-layer processing unit 301 and the demodulated encoding bit. The channel measurement unit 309 measures the estimation value of the propagation path, the channel quality, and the like from the uplink reference signal input from the demultiplexing unit 3055 and outputs the measurement result to the demultiplexing unit 3055 and the upper-layer processing unit 301.

The transmission unit 307 generates the downlink reference signal according to the control signals input from the control unit 303, encodes and modulates the HARQ indicator and the downlink control information, and downlink data input from the upper-layer processing unit 301, multiplexes the PHICH, the PDCCH, the EPDCCH, the PDSCH, and the downlink reference signal, and outputs the signals to the mobile station devices 1 through the transmission/reception antenna 309.

The coding unit 3071 encodes the HARQ indicator, the downlink control information, and downlink data input from the upper-layer processing unit 301 using an encoding system determined in advance, such as block encoding, convolution encoding, or turbo encoding, or an encoding system determined by the radio resource control unit 3011. The modulation unit 3073 modulates the encoding bit input from the coding unit 3071 by a modulation system determined in advance, such as BPSK, QPSK, 16QAM, or 64QAM, or a modulation system determined by the radio resource control unit 3011.

The downlink reference signal generation unit 3079 generates a sequence obtained by a rule determined in advance based on the physical layer cell identifier (PCI) or the like for identifying the base station device 3 and known to the mobile station devices 1 as the downlink reference signal. The multiplexing unit 3075 multiplexes the modulation symbols of each modulated channel and the generated downlink reference signal. That is, the multiplexing unit 3075 maps the modulation symbols of each modulated channel and the generated downlink reference signal in the resource elements.

The radio transmission unit 3077 performs inverse fast Fourier transform (IFFT) on the multiplexed modulation symbols and the like, performs modulation according to an OFDM system, appends a guard interval to the OFDM-modulated OFDM symbols, generates baseband digital signals, converts the baseband digital signals to analog signals, generates in-phase components and quadrature components having an intermediate frequency from the analog signals, removes excessive frequency components for the intermediate frequency band, converts the signals having the intermediate frequency to signals having a high frequency (up convert), removes excessive frequency components, performs power amplification, and outputs and transmits the power-amplified signals to the transmission/reception antenna 309.

The PDCCH or the EPDCCH is used to notify (designate) the downlink control information (DCI) to a terminal. For example, the downlink control information includes information concerning the resource allocation of the PDSCH, information concerning MCS (Modulation and Coding scheme), information concerning scrambling identity (referred to as scrambling identifier), information concerning reference signal sequence identity (referred to as base sequence identity, base sequence identifier, or base sequence index), and the like.

Hereinafter, the details of the PDCCH will be described. The PDCCH (first control channel) has a plurality of control channel elements (CCE). The number of CCEs which are used by each downlink component carrier depends on a downlink component carrier bandwidth, the number of OFDM symbols of the PDCCH, and the number of transmission antenna ports of the cell-specific reference signal of the downlink according to the number of transmission antennas of the base station device 3 for communication. Each CCE has a plurality of downlink resource elements (a resource determined by one OFDM symbol and one sub-carrier).

The CCEs which are used between the base station device 3 and the mobile station devices 1 are appended with numbers for identifying the CCEs. Numbering of the CCEs is performed specific to the base station device 3 based on a rule determined in advance. The PDCCH has one or more CCEs. The number of CCEs of one PDCCH is referred to as a CCE aggregation level. In the base station device 3, the CCE aggregation level of the PDCCH is set according to the encoding rate set in the PDCCH and the number of bits of the DCI included in the PDCCH. A combination of CCE aggregation levels likely to be used for the mobile station devices 1 is determined in advance.

In addition, one CCE has nine different resource element groups (REG) distributed in the frequency domain and the time domain. One resource element group has four adjacent resource elements of the frequency domain. Specifically, interleaving is performed for all numbered resource element groups in terms of resource element groups using a block interleaver for all downlink component carriers, and one CCE has nine consecutive resource element groups having continuous numbers after interleaving.

In each terminal, a region (SS; Search Space) where the PDCCH is searched is set. The SS has a plurality of CCEs. The SS has a plurality of CCEs with consecutive numbers from the smallest CCE, and the number of a plurality of CCEs with consecutive numbers is determined in advance. The SS of each CCE aggregation level is constituted by an aggregate of candidates of a plurality of PDCCHs. The SS is classified into a CSS (Cell-specific SS) where the number is common in a cell from the smallest CCE and a USS (UE-specific SS) where the number is specific to a terminal from the smallest CCE. In the CSS, the PDCCH to which control information, such as system information or information concerning paging, read by a plurality of terminals is allocated, or the PDCCH to which a downlink/uplink grant indicating a fallback or a random access to a lower-level transmission system is allocated can be allocated.

The base station device 3 transmits the PDCCH using one or more CCEs in the SS set in the mobile station devices 1. The mobile station devices 1 decode the reception signals using one or more CCEs in the SS and perform processing for detecting the PDCCH addressed to the mobile station devices (referred to as blind decoding). The mobile station devices 1 set a different SS for each CCE aggregation level. Thereafter, the mobile station devices 1 perform blind decoding using a combination of CCEs determined in advance in a different SS for each CCE aggregation level. In other words, the mobile station devices 1 perform blind decoding on the candidates of each PDCCH in a different SS for each CCE aggregation level. A series of processing in the mobile station devices 1 is referred to as monitoring of the PDCCH.

Hereinafter, the details of the EPDCCH will be described. Similarly to the PDCCH, the EPDCCH is used to notify of the DCI (Downlink control information).

The EPDCCH is transmitted using an aggregation of one or more ECCEs (Enhanced control channel elements). Each ECCE has a plurality of EREGs (Enhanced resource element groups). The EREGs are used to define mapping to the resource elements of the EPDCCH. In each RB pair, 16 EREGs numbered 0 to 15 are defined. That is, in each RB pair, EREG0 to EREG15 are defined. In each RB pair, EREG0 to EREG15 are defined periodically with priority to the frequency direction for resource elements other than resource elements to which predetermined signals and/or channels are mapped. For example, resource elements to which a demodulation reference signal associated with the EPDCCH transmitted through antenna ports 107 to 110 is mapped define no EREGs.

The number of ECCEs used for one EPDCCH depends on an EPDCCH format and is determined based on other parameters. The number of ECCEs used for one EPDCCH is referred to as an aggregation level. For example, the number of ECCEs used for one EPDCCH is determined based on the number of resource elements which can be used for EPDCCH transmission in one RB pair, a transmission method of the EPDCCH, and the like. For example, the number of ECCEs used for one EPDCCH is 1, 2, 4, 8, 16, or 32. The number of EREGs used for one ECCE is determined based on the type of a subframe and the type of a cyclic prefix and is 4 or 8. As the transmission method of the EPDCCH, distributed transmission and localized transmission are supported.

The EPDCCH can use the distributed transmission and the localized transmission. The distributed transmission and the localized transmission are different in mapping of the ECCEs to the EREGs and the RB pairs. For example, in the distributed transmission, one ECCE is constituted using the EREGs of a plurality of RB pairs. In the localized transmission, one ECCE is constituted using the EREGs of one RB pair.

The base station device 3 performs the configuration concerning the EPDCCH for the mobile station devices 1. The mobile station devices 1 monitor a plurality of EPDCCHs based on the configuration from the base station device 3. A set of RB pairs which the mobile station devices 1 monitor the EPDCCH can be set. A set of RB pairs is referred to as an EPDCCH set or an EPDCCH-PRB set. One or more EPDCCH sets can be set for one mobile station device 1. Each EPDCCH set has one or more RB pairs. The configuration concerning the EPDCCH can be performed separately for each EPDCCH set.

Figure 9:
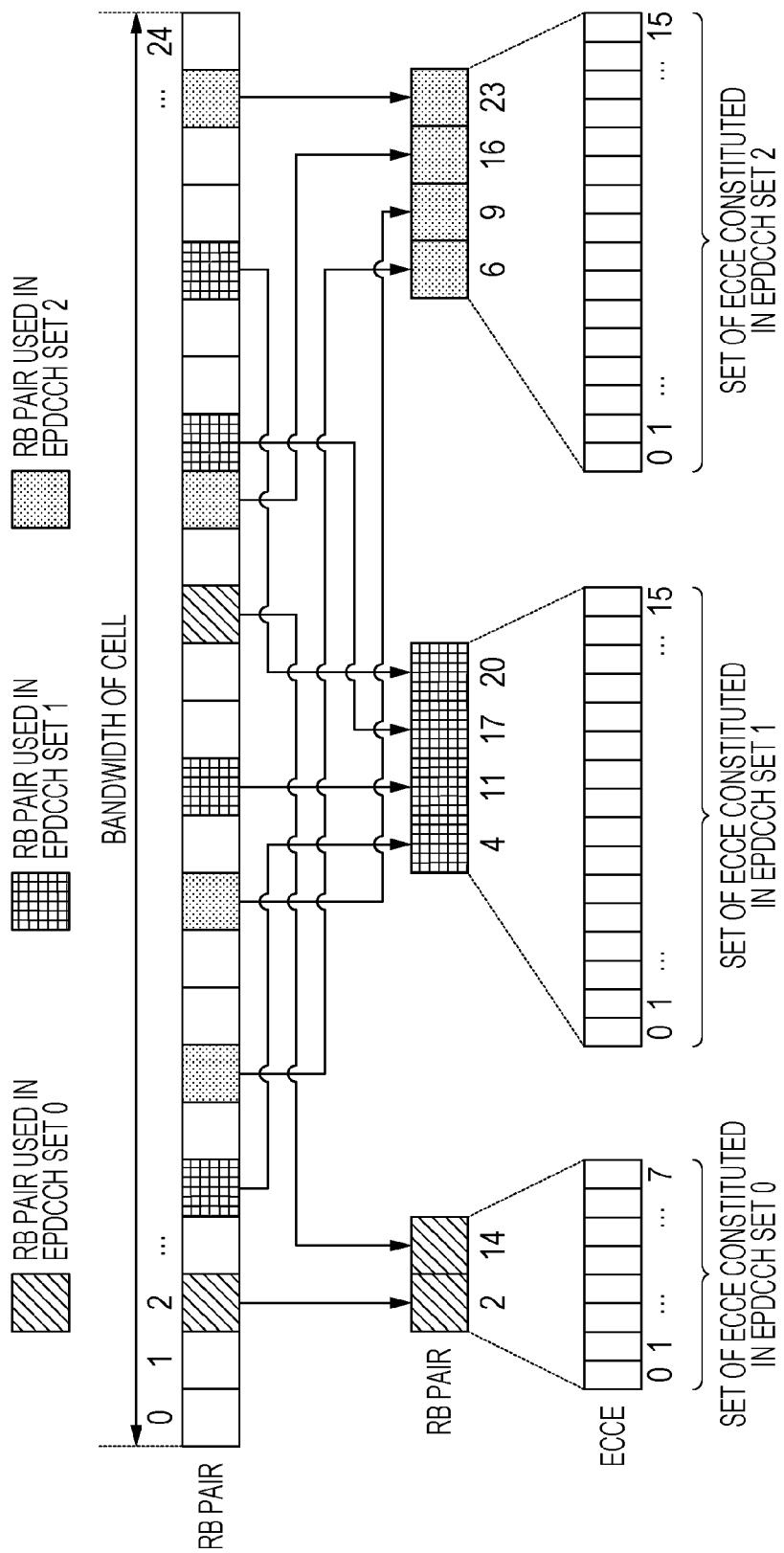
FIG. 9 is a diagram showing an example of an EPDCCH set.

FIG. 9 is a diagram showing an example of an EPDCCH set. In FIG. 9, in a bandwidth of a cell having 25 RB pairs, three EPDCCH sets are set as EPDCCH sets 0 to 2. For example, the EPDCCH set 0 has two RB pairs, the EPDCCH set 1 has four RB pairs, and the EPDCCH set 2 has four RB pairs. Each EPDCCH set constitutes one set of a plurality of ECCEs. The number of ECCEs in one EPDCCH set is determined based on the number of RB pairs set as the EPDCCH set and the number of EREGs used for one ECCE. When the number of ECCEs in one EPDCCH set is N, each EPDCCH set has ECCEs numbered 0 to N−1. When the number of EREGs which are used for one ECCE is 4, the EPDCCH set 0 has eight ECCEs, the EPDCCH set 1 has 16 ECCEs, and the EPDCCH set 2 has 16 ECCEs.

The candidates of the EPDCCH which are monitored by the mobile station devices 1 are defined based on the ECCEs in the EPDCCH set. A set of candidates of the EPDCCH is defined as a search space (search region). A UE-specific search space which is a search space specific to the mobile station devices 1 and a common search space which is a search space specific to the base station device 3 (cell, transmission point, UE group) are defined. The monitoring of the EPDCCH includes that the mobile station devices 1 attempt to decode each of the candidates of the EPDCCH in the search space according to the DCI format to be monitored.

Figure 10:
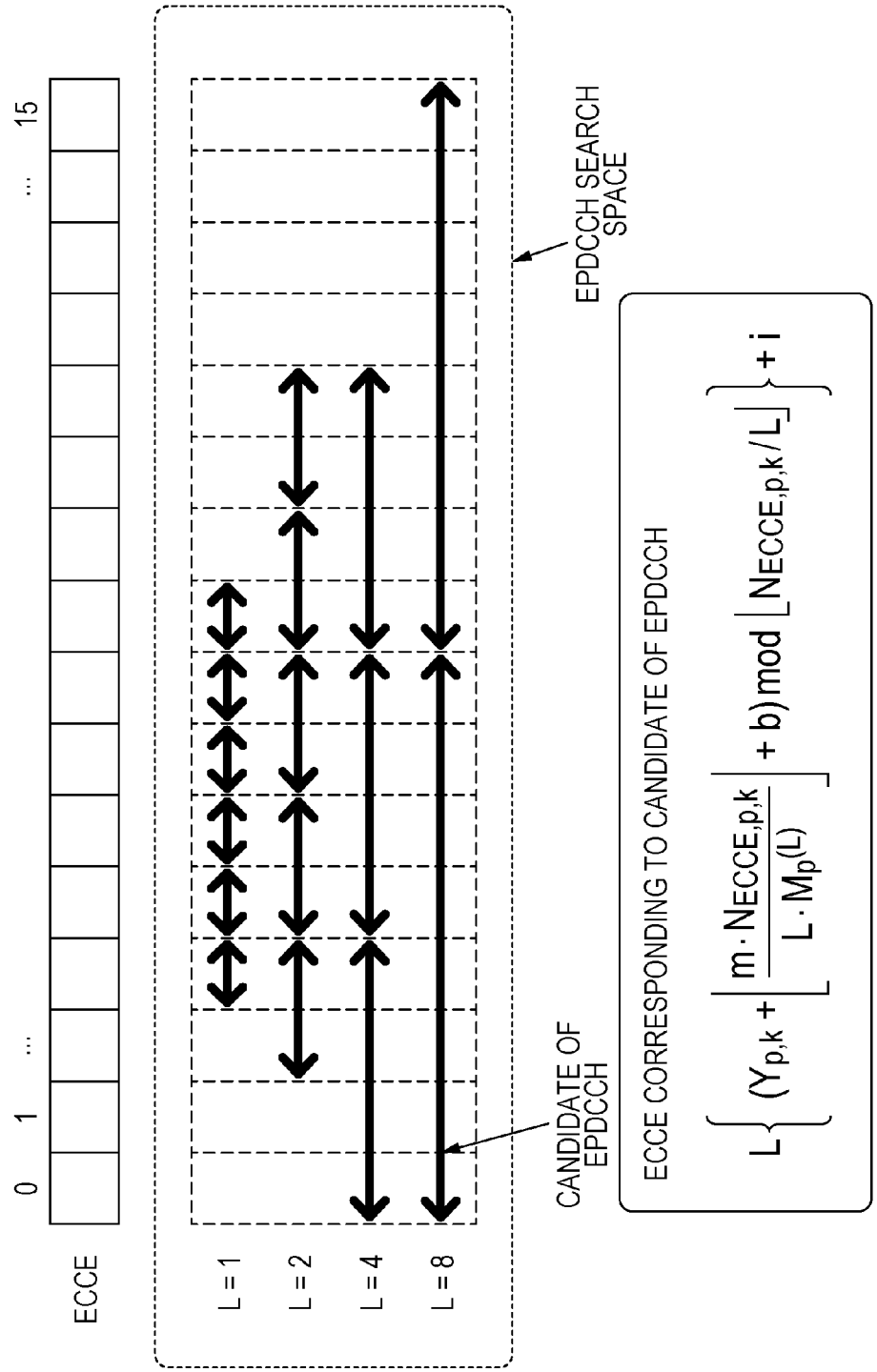
FIG. 10 is a diagram showing an example of an EPDCCH search space.

FIG. 10 is a diagram showing an example of an EPDCCH search space. In FIG. 10, an example of a search space where an aggregation level L is 1, 2, 4, and 8 in an EPDCCH set having 16 ECCEs is shown. When the aggregation level L is 1, 2, 4, and 8, the number of candidates of the EPDCCH is 6, 5, 3, and 2. The ECCEs corresponding to the candidates of the EPDCCH in the search space is given by a numerical expression in FIG. 10. However, m represents an index of each of the candidates of the EPDCCH and is 0 to $M_p^{(L)}-1$. $M_p^{(L)}$ is the number of candidates of the EPDCCH monitored by the aggregation level L in an EPDCCH set p. $N_{ECCE,p,k}$ is the number of ECCEs in an EPDCCH set p of a subframe k. b is the value of the CIF when a CIF (Carrier indicator field) is set and is 0 otherwise. i is 0 to L−1. In FIG. 10, $Y_{p,k}$ is 3. When the aggregation level L is 4, the candidate 0 of the EPDCCH is given by the ECCEs 0 to 3, the candidate 1 of the EPDCCH is given by the ECCEs 4 to 7, and the candidate 2 of the EPDCCH is given by the ECCEs 8 to 11.

$Y_{p,k}$ represents a value in the EPDCCH set p and the subframe k. $Y_{p,k}$ can be set independently by a search space. In the common search space, $Y_{p,k}$ is a value specific to the base station device 3 (cell). For example, in the common search space, $Y_{p,k}$ is a value defined in advance or a value determined based on the parameters specific to the base station device 3. In the UE-specific search space, $Y_{p,k}$ is a value specific to the mobile station devices 1. For example, $Y_{p,k}$ is a predetermined value and is determined based on the subframe k and the RNTI (for example, C-RNTI) of the mobile station device 1. In FIG. 10, $Y_{p,k}$ is 3. A plurality of common search spaces and/or a plurality of UE-specific search spaces may be set in one EPDCCH set.

Although the search space is set in each aggregation, in the following description, a set of search spaces in each aggregation is simply referred to as a search space. That is, in the following description, a search space includes a set of search spaces.

Hereinafter, the details of the subframe configuration will be described.

For example, the subframe configuration is a configuration concerning the type of the subframe for each subframe. The type of a subframe includes a downlink subframe, an uplink subframe, a special subframe, and a flexible subframe. In the following description, the downlink subframe is referred to as D, the uplink subframe is referred to as U, the special subframe is referred to as S, and the flexible subframe is referred to as F.

The subframe configuration can be performed using information of various forms or formats. For example, the subframe configuration can be performed using explicit or implicit information for each subframe. The subframe configuration can be performed using explicit or implicit information for a predetermined number of subframes. The subframe configuration can be performed using information corresponding to a plurality of subframe configurations defined in advance.

FIG. 11 is an example of an uplink-downlink configuration. In FIG. 11, as the subframe configuration, an uplink-downlink configuration is used. Seven uplink-downlink configurations are defined in advance, and a number (index) corresponding to each uplink-downlink configuration is allocated. In each uplink-downlink configuration, the type of the subframe is defined for ten subframes in one radio frame. For example, the base station device 3 notifies each mobile station device 1 of the number of the uplink-downlink configuration, whereby the base station device 3 can perform the uplink-downlink configuration in the radio frame to the mobile station device 1. The mobile station device 1 is notified of the number of the uplink-downlink configuration from the base station device 3, whereby the mobile station device 1 can be subjected to the uplink-downlink configuration in the radio frame from the base station device 3.

The uplink-downlink configuration is a configuration concerning the pattern of a subframe in a radio frame. The uplink-downlink configuration represents whether each subframe in a radio frame is a downlink subframe, an uplink subframe, or a special subframe.

The pattern of a downlink subframe, an uplink subframe, or a special subframe represents whether each of subframes #0 to #9 is a downlink subframe, an uplink subframe, and a special subframe, and is preferably expressed by an arbitrary combination of D, U, and S having a length of 10. More preferably, the head subframe (that is, the subframe #0) is D, and the second subframe (that is, the subframe #1) is S.

In FIG. 11, the subframe 1 in the radio frame is constantly a special subframe. In FIG. 11, the subframes 0 and 5 are constantly reserved for downlink transmission, and the subframe 2 is constantly reserved for uplink transmission. In FIG. 11, when the downlink-to-uplink switch-point periodicity is 5 ms, the subframe 6 in the radio frame is a special subframe, and when the downlink-to-uplink switch-point periodicity is 10 ms, the subframe 6 in the radio frame is a downlink subframe.

The base station device 3 performs the subframe configuration in predetermined subframes to each mobile station device 1. The mobile station device 1 monitors the control channels including the PDCCH and/or the EPDCCH based on the subframe configuration set from the base station device 3.

The subframe configuration can be performed using various methods or control information. For example, the subframe configuration is performed using one or more uplink-downlink configurations and/or one or more kinds of bitmap information. The control information which is used for the subframe configuration can be transmitted as information specific to the base station device 3 or each mobile station device 1. The control information which is used for the subframe configuration can be transmitted using various methods, such as the PDCCH, the EPDCCH, the MIB, the SIB, and/or the RRC. The bitmap information is information of a bitmap format for predetermined subframes. For example, an EPDCCH subframe configuration is a configuration concerning the monitoring of the EPDCCH as the bitmap information.

The monitoring of the control channels can be switched (determined) based on the subframe configuration. For example, in the monitoring of the control channels, first monitoring and second monitoring can be switched based on the subframe configuration. The monitoring of the control channels determined based on the subframe configuration can be performed using various methods or rules.

The monitoring of the control channels can switch among different control channels and/or different search spaces. For example, in the monitoring of the control channels, a PDCCH or an EPDCCH is determined. In the monitoring of the control channels, a PDCCH search space (PDCCH-SS) or an EPDCCH search space (EPDCCH-SS) is determined. In the monitoring of the control channels, a CSS or a USS is determined. In the monitoring of the control channels, a PDCCH-CSS which is a common search space for monitoring the PDCCH, a PDCCH-USS which is a UE-specific search space for monitoring the PDCCH, an EPDCCH-CSS which is a common search space for monitoring the EPDCCH, or an EPDCCH-USS which is a UE-specific search space for monitoring the EPDCCH is determined. The EPDCCH-SS includes the EPDCCH-CSS and the EPDCCH-USS. The PDCCH-SS includes the PDCCH-CSS and the PDCCH-USS.

The CSS is a search space which is set using parameters specific to the base station device 3 (cell, transmission point) and/or parameters defined in advance. For example, the CSS is a search space which can be used in common by a plurality of mobile station devices. For this reason, the base station device 3 maps the control channels common to a plurality of mobile station devices to the CSS, thereby reducing the resources for transmitting the control channels. The USS is at least a search space which is set using the parameters specific to the mobile station devices 1. For this reason, since the USS can transmit the control channels specific to the mobile station devices 1 individually, the base station device 3 can efficiently control the mobile station devices 1.

The CSS may be set further using the parameters specific to the mobile station devices 1. In this case, it is preferable that the parameters specific to the mobile station devices 1 are set to have the same values among a plurality of mobile station devices. Even when the CSS is set further using the parameters specific to the mobile station devices 1, the CSS is common among a plurality of mobile station devices in which the same parameters are set. For example, a unit in which the same parameters are set among a plurality of mobile station devices is a cell, a transmission point, a UE group, or the like. Since a plurality of mobile station devices in which the same parameters are set can receive the common control channels mapped to the CSS, the resources for transmitting the control channels can be reduced. The search space is referred to as a USS, instead of a CSS. That is, a USS which is a search space common to a plurality of mobile station devices may be set. A USS specific to one mobile station device is referred to as a first USS, and a USS common to a plurality of mobile station devices is referred to as a second USS.

In the monitoring of the control channels, configurations set independently can be further switched for the same control channel and/or the same search space. The configurations are processing or configurations for the control channels to be monitored. The configurations include configurations defined in advance. When a plurality of configurations are set or defined and the configurations are independent, the processing or the configurations for the control channels to be monitored are independent from one another. A configuration 1 (first configuration) and a configuration 2 (second configuration) correspond to first processing or configuration and second processing or configuration for the control channels to be monitored. The monitoring of the configuration 1 and the monitoring of the configuration 2 can be made different and are respectively referred to as first monitoring and second monitoring. For example, the configurations set independently process mapping of the control channels to be monitored to the resource elements independently. The configuration 1 and the configuration 2 correspond to first mapping and second mapping of the control channels to be monitored to the resource elements. The monitoring of the control channels corresponding to the configurations set independently of the same control channel and/or the same search space can be regarded as independent monitoring. That is, the monitoring of the control channels can switch among the configurations set independently for the same control channel and/or the same search space.

The monitoring of the control channels can switch among different control channels, different search spaces, and/or different configurations. In the monitoring of the control channels corresponding to different control channels, different search spaces, and/or different configurations, the processing or the configurations of the control channels can be made different. For example, when the monitoring of the control channels is different, in the respective monitoring, the mappings (mapping methods, mapping rules) of the control channels to be monitored to the resource elements can be made different. Specifically, different mappings are different in the resource elements which are not used for the mapping of the control channels, and the configuration or standard. The resource elements which are not used for the mapping of the control channels are regions or the like before a start symbol in the CRS, the NZP CSI-RS, the ZP CSI-RS, and the RB pair.

The processing or the configurations of the control channels to be monitored can be performed using various methods or assumptions. The processing or the configurations of the control channels to be monitored can be determined or switched based on the monitoring of the control channels. For example, the processing or the configurations of the control channels to be monitored are parameters for performing demodulation processing and/or decoding processing on the control channels. For example, the processing or the configurations of the control channels to be monitored are response signals to the PDSCH scheduled on the control channels.

Figure 12:
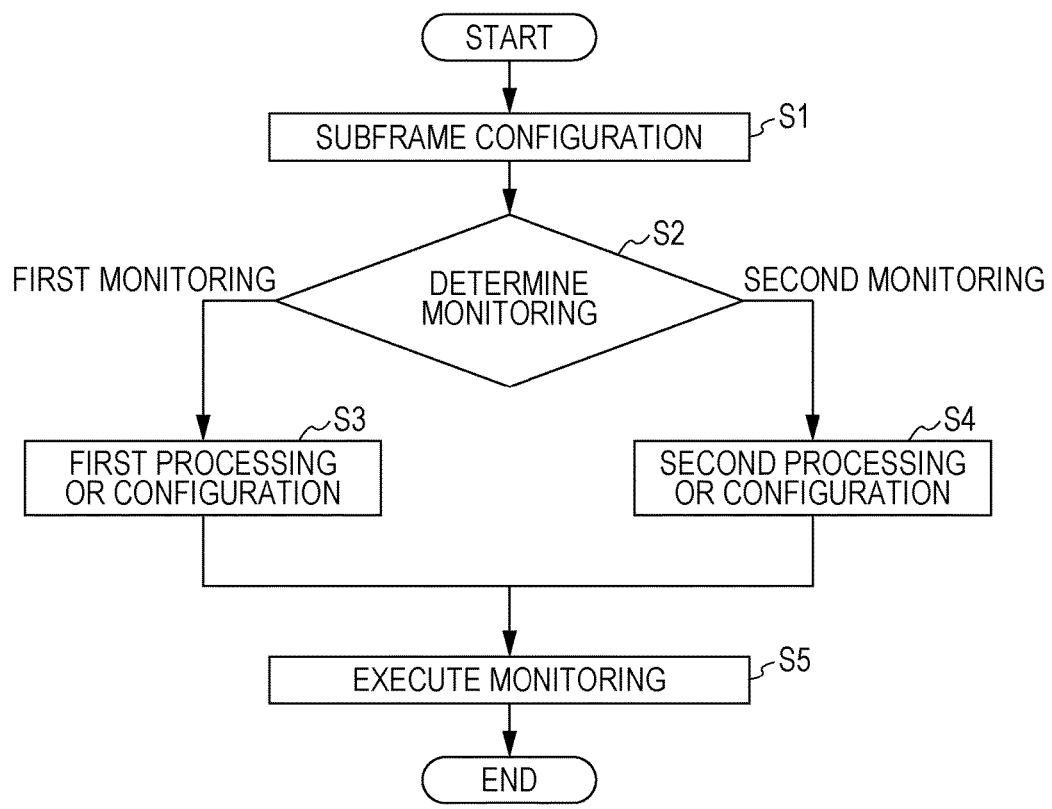
FIG. 12 is a diagram showing an example of a flowchart concerning monitoring of control channels in mobile station devices.

FIG. 12 is a diagram showing an example of a flowchart concerning monitoring of control channels in a mobile station device. In Step S1, the mobile station devices 1 are subjected to the subframe configuration by the base station device 3. In Step S2, the mobile station devices 1 determine the monitoring of the control channels based on the subframe configuration performed in Step S1. The mobile station devices 1 determine the processing or the configurations of the control channels to be monitored based on at least the monitoring of the control channel determined or set in Step S2. When the first monitoring is determined in Step S2, in Step S3, the mobile station devices 1 determine the first processing or configuration for the control channels to be monitored. When the second monitoring is determined in Step S2, in Step S4, the mobile station devices 1 determine the second processing or configuration for the control channels to be monitored. In Step S5, the mobile station devices 1 monitor the control channels based on the processing or configuration determined in Step S3 or S4.

The base station device 3 performs the subframe configuration on the mobile station devices 1. The base station device 3 determines the monitoring of the control channels in the mobile station devices 1 based on the subframe configuration on the mobile station devices 1. The base station device 3 determines the processing or the configurations of the control channels of the mobile station devices 1 based on the monitoring of the control channels determined for the mobile station devices 1. When the first monitoring is determined for the mobile station devices 1, the base station device 3 determines the first processing or configuration for the control channels of the mobile station devices 1. When the second monitoring is determined for the mobile station devices 1, the base station device 3 determines the second processing or configuration for the control channels of the mobile station devices 1. The base station device 3 maps the control channels of the mobile station devices 1 to physical resources or logical resources based on the determined processing or configuration of the control channels.

Three or more kinds of the monitoring of the control channels and the processing or configurations of the control channel to be monitored may set or defined.

FIG. 13 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using one uplink-downlink configuration and one EPDCCH subframe configuration. For example, the uplink-downlink configuration is set through the SIB as a configuration specific to the base station device 3 (cell). The EPDCCH subframe configuration is set through RRC signaling as a configuration specific to the mobile station devices 1.

The mobile station devices 1 perform the monitoring of the control channels based on the subframe configuration from the base station device 3. An example of the monitoring of the control channels switches monitoring of the PDCCH-SS or monitoring of the EPDCCH-SS for each subframe.

A subframe where the uplink-downlink configuration is D or S performs the monitoring of the control channels. Of the subframes where the monitoring of the control channels is performed, a subframe where the EPDCCH subframe configuration is 1 performs the monitoring of the EPDCCH-SS. Of the subframes where the monitoring of the control channels is performed, a subframe where the EPDCCH subframe configuration is 0 performs the monitoring of the PDCCH-SS. A subframe where the uplink-downlink configuration is U does not perform the monitoring of the control channels.

The monitoring of the EPDCCH-SS is performed in a subframe where the uplink-downlink configuration is D or S and the EPDCCH subframe configuration is 1. The monitoring of the PDCCH-SS is performed in a subframe where the uplink-downlink configuration is D or S and the EPDCCH subframe configuration is 0. The monitoring of the control channels is not performed in a subframe where the uplink-downlink configuration is U and the EPDCCH subframe configuration is 0.

The mobile station devices 1 determine or switch the processing or the configurations of the control channels to be monitored according to whether the monitoring in the subframe is the monitoring of the PDCCH-SS or the monitoring of the EPDCCH-SS.

It can be assumed that, in the mobile station devices 1, the EPDCCH subframe configuration does not become 1 in a subframe where the uplink-downlink configuration is U. The monitoring of the control channels cannot be performed in a subframe where the uplink-downlink configuration is U, without depending on the EPDCCH subframe configuration. Even if the uplink-downlink configuration for a certain subframe is U, when the EPDCCH subframe configuration for the subframe is 1, the monitoring of the EPDCCH-SS may be performed. Even if the uplink-downlink configuration for a certain subframe is U, when the EPDCCH subframe configuration for the subframe is 0, the monitoring of the PDCCH-SS may be performed.

FIG. 14 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations for the control channels to be monitored are independent.

A subframe where at least one of the uplink-downlink configuration 1 and the uplink-downlink configuration 2 is D or S performs the monitoring of the control channels. In the subframes where the monitoring of the control channels is performed, the monitoring of the EPDCCH-SS (configuration 1) and the monitoring of the EPDCCH-SS (configuration 2) are determined based on the uplink-downlink configuration 1 and the uplink-downlink configuration 2. Within the subframes where the monitoring of the control channels is performed, the monitoring of the EPDCCH-SS (configuration 1) is performed in a subframe where both the uplink-downlink configuration 1 and the uplink-downlink configuration 2 are D or S. Within the subframes where the monitoring of the control channels is performed, the monitoring of the EPDCCH-SS (configuration 1) is performed in a subframe where either of the uplink-downlink configuration 1 and the uplink-downlink configuration 2 is D and the other one of the uplink-downlink configuration 1 and the uplink-downlink configuration 2 is S. Within the subframes where the monitoring of the control channels is performed, the monitoring of the EPDCCH-SS (configuration 2) is performed in a subframe where either of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U.

The monitoring of the EPDCCH-SS (configuration 1) is performed in a subframe where both the uplink-downlink configuration 1 and the uplink-downlink configuration 2 are D or S. The monitoring of the EPDCCH-SS (configuration 1) is performed in a subframe where one of the uplink-downlink configuration 1 and the uplink-downlink configuration 2 is D and the other one of the uplink-downlink configuration 1 and the uplink-downlink configuration 2 is S. The monitoring of the EPDCCH-SS (configuration 2) is performed in a subframe where one of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U. The monitoring of the PDCCH-SS is not performed in all subframes.

It can be assumed that, in the mobile station devices 1, the uplink-downlink configuration 2 is not U in a subframe where the uplink-downlink configuration 1 is D. In a subframe where the uplink-downlink configuration 1 is D and the uplink-downlink configuration 2 is U, it may be performed the monitoring of the PDCCH-SS, the monitoring of the EPDCCH-SS (configuration 1), or the monitoring of the EPDCCH-SS (configuration 2). In a subframe where the uplink-downlink configuration 1 or the uplink-downlink configuration 2 is S and the uplink-downlink configuration 1 or the uplink-downlink configuration 2 is D or U, it may be performed the monitoring of the PDCCH-SS, the monitoring of the EPDCCH-SS (configuration 1), or the monitoring of the EPDCCH-SS (configuration 2).

Figure 15:
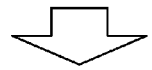
FIG. 15 is a diagram showing an example of a subframe configuration and monitoring of control channels.

FIG. 15 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and one EPDCCH subframe configuration. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The EPDCCH subframe configuration is configured through RRC signaling as a configuration specific to the mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

A subframe where at least one of the uplink-downlink configuration 1 and the uplink-downlink configuration 2 is D or S performs the monitoring of the control channels. Of the subframes where the monitoring of the control channels is performed, a subframe where the EPDCCH subframe configuration is 0 performs the monitoring of the PDCCH-SS. Of the subframes where the monitoring of the control channels is performed, a subframe where the EPDCCH subframe configuration is 1 performs the monitoring of the EPDCCH-SS. In the subframe where the monitoring of the EPDCCH-SS is performed, the monitoring of the EPDCCH-SS (configuration 1) or the monitoring of the EPDCCH-SS (configuration 2) is determined based on the uplink-downlink configuration 1 and the uplink-downlink configuration 2. Of the subframes where the monitoring of the EPDCCH-SS is performed, a subframe where both the uplink-downlink configuration 1 and the uplink-downlink configuration 2 are D or S performs the monitoring of the EPDCCH-SS (configuration 1). Of the subframes where the monitoring of the EPDCCH-SS is performed, a subframe where either of the uplink-downlink configuration 1 and the uplink-downlink configuration 2 is D and the other one of the uplink-downlink configuration 1 and the uplink-downlink configuration 2 is S performs the monitoring of the EPDCCH-SS (configuration 1). Of the subframes where the monitoring of the EPDCCH-SS is performed, a subframe where either of the uplink-downlink configuration 1 and the uplink-downlink configuration 2 is U and the other one of the uplink-downlink configuration 1 and the uplink-downlink configuration 2 is D or S performs the monitoring of the EPDCCH-SS (configuration 2). A subframe where both the uplink-downlink configuration 1 and the uplink-downlink configuration 2 are U does not perform the monitoring of the control channels.

The monitoring of the PDCCH-SS is performed in a subframe where at least one of the uplink-downlink configuration 1 and the uplink-downlink configuration 2 is D or S and the EPDCCH subframe configuration is 0. The monitoring of the EPDCCH-SS (configuration 1) is performed in a subframe where both the uplink-downlink configuration 1 and the uplink-downlink configuration 2 are D or S and the EPDCCH subframe configuration is 1. The monitoring of the EPDCCH-SS (configuration 1) is performed in a subframe where either of the uplink-downlink configuration 1 and the uplink-downlink configuration 2 is D, the other one of the uplink-downlink configuration 1 and the uplink-downlink configuration 2 is S, and the EPDCCH subframe configuration is 1. The monitoring of the EPDCCH-SS (configuration 2) is performed in a subframe where one of the uplink-downlink configuration 1 and the uplink-downlink configuration 2 is D or S, the other one of the uplink-downlink configuration 1 and the uplink-downlink configuration 2 is U, and the EPDCCH subframe configuration is 1. The monitoring of the control channels is not performed in a subframe where both the uplink-downlink configuration 1 and the uplink-downlink configuration 2 are U.

It may be assumed that, in the mobile station devices 1, the uplink-downlink configuration 2 does not become U in a subframe where the uplink-downlink configuration 1 is D. A subframe where the uplink-downlink configuration 1 is D and the uplink-downlink configuration 2 is U may perform the monitoring of the PDCCH-SS, the monitoring of the EPDCCH-SS (configuration 1), or the monitoring of the EPDCCH-SS (configuration 2). A subframe where the uplink-downlink configuration 1 or the uplink-downlink configuration 2 is S and the uplink-downlink configuration 1 or the uplink-downlink configuration 2 is D or U may perform the monitoring of the PDCCH-SS, the monitoring of the EPDCCH-SS (configuration 1), or the monitoring of the EPDCCH-SS (configuration 2).

It may be assumed that, in the mobile station devices 1, the EPDCCH subframe configuration does not become 1 in a subframe where the uplink-downlink configuration 1 and/or the uplink-downlink configuration 2 are U. In a subframe where the uplink-downlink configuration 1 and/or the uplink-downlink configuration 2 are U, the monitoring of the control channels cannot be performed, without depending on the EPDCCH subframe configuration. Even if the uplink-downlink configuration 1 and the uplink-downlink configuration 2 for a certain subframe are U, when the EPDCCH subframe configuration for the subframe is 1, the monitoring of the EPDCCH-SS may be performed. Even if the uplink-downlink configuration 1 and/or the uplink-downlink configuration 2 for a certain subframe are U, when the EPDCCH subframe configuration for the subframe is 0, the monitoring of the PDCCH-SS may be performed.

The monitoring of the PDCCH-SS may further switch the processing or the configurations of the control channels to be monitored based on the uplink-downlink configuration 1 and the uplink-downlink configuration 2. That is, in a subframe where the monitoring of the PDCCH-SS is performed, the monitoring of the EPDCCH-SS (configuration 1) and the monitoring of the EPDCCH-SS (configuration 2) may be determined based on the uplink-downlink configuration 1 and the uplink-downlink configuration 2. For example, of the subframes where the monitoring of the PDCCH-SS is performed, a subframe where both the uplink-downlink configuration 1 and the uplink-downlink configuration 2 are D or S may perform the monitoring of the EPDCCH-SS (configuration 1). Of the subframes where the monitoring of the PDCCH-SS is performed, a subframe where either of the uplink-downlink configuration 1 and the uplink-downlink configuration 2 is U may perform the monitoring of the EPDCCH-SS (configuration 2).

Figure 16:
FIG. 16 is a diagram showing an example of a subframe configuration and monitoring of control channels.

FIG. 16 is a diagram showing an example of a subframe configuration and monitoring of control channels. "O" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using one uplink-downlink configuration and two EPDCCH subframe configurations. For example, the uplink-downlink configuration is configured through the SIB as a configuration specific to the base station device 3 (cell). An EPDCCH subframe configuration 1 and an EPDCCH subframe configuration 2 are configured through RRC signaling as a configuration specific to the mobile station devices 1. The EPDCCH subframe configuration 1 and the EPDCCH subframe configuration 2 may be configured as a configuration specific to the base station device 3 (cell).

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

A subframe where the uplink-downlink configuration is D or S and a subframe where at least one of the EPDCCH subframe configuration 1 and the EPDCCH subframe configuration 2 is 1 perform the monitoring of the control channels. Of the subframes where the monitoring of the control channels is performed, a subframe where both the EPDCCH subframe configuration 1 and the EPDCCH subframe configuration 2 are 0 performs the monitoring of the PDCCH-SS. Of the subframes where the monitoring of the control channels is performed, a subframe where the EPDCCH subframe configuration 1 is 1 performs the monitoring of the EPDCCH-SS (configuration 1). Of the subframes where the monitoring of the control channels is performed, a subframe where the EPDCCH subframe configuration 2 is 1 performs the monitoring of the EPDCCH-SS (configuration 2). A subframe where the uplink-downlink configuration is U and the EPDCCH subframe configuration 1 and the EPDCCH subframe configuration 2 are 0 does not perform the monitoring of the control channels.

The monitoring of the PDCCH-SS is performed in a subframe where the uplink-downlink configuration is D or S and both the EPDCCH subframe configuration 1 and the EPDCCH subframe configuration 2 are 0. The monitoring of the EPDCCH-SS (configuration 1) is performed in a subframe where the EPDCCH subframe configuration 1 is 1, without depending on the uplink-downlink configuration. The monitoring of the EPDCCH-SS (configuration 2) is performed in a subframe where the EPDCCH subframe configuration 2 is 1, without depending on the uplink-downlink configuration. The monitoring of the control channels is not performed in a subframe where the uplink-downlink configuration is U and the EPDCCH subframe configuration 1 and the EPDCCH subframe configuration 2 are 0.

It may be assumed that, in the mobile station devices 1, EPDCCH subframe configuration 1 and/or the EPDCCH subframe configuration 2 do not become 1 in a subframe where the uplink-downlink configuration is U. In a subframe where the uplink-downlink configuration is U, the monitoring of the control channels cannot be performed, without depending on the EPDCCH subframe configuration 1 and/or the EPDCCH subframe configuration 2. A subframe where the uplink-downlink configuration is U and the EPDCCH subframe configuration 1 and/or the EPDCCH subframe configuration 2 are 0 may perform the monitoring of the PDCCH-SS, the monitoring of the EPDCCH-SS (configuration 1), or the monitoring of the EPDCCH-SS (configuration 2).

A subframe where both the EPDCCH subframe configuration 1 and the EPDCCH subframe configuration 2 are 1 may perform the monitoring of the EPDCCH-SS (configuration 1) and the monitoring of the EPDCCH-SS (configuration 2). It may be assumed that, in the mobile station devices 1, both the EPDCCH subframe configuration 1 and the EPDCCH subframe configuration 2 do not become 1. When both the EPDCCH subframe configuration 1 and the EPDCCH subframe configuration 2 are 1, it may be assumed that either the EPDCCH subframe configuration 1 or the EPDCCH subframe configuration 2 is 1. That is, a subframe where both the EPDCCH subframe configuration 1 and the EPDCCH subframe configuration 2 are 1 and the monitoring of the control channels is performed may perform the monitoring of the EPDCCH-SS (configuration 1) or the monitoring of the EPDCCH-SS (configuration 2). When both the EPDCCH subframe configuration 1 and the EPDCCH subframe configuration 2 are 1, it may be assumed that both the EPDCCH subframe configuration 1 and the EPDCCH subframe configuration 2 are 0. That is, a subframe where both the EPDCCH subframe configuration 1 and the EPDCCH subframe configuration 2 are 1 and the monitoring of the control channels is performed may perform the monitoring of the PDCCH-SS. A subframe where both the EPDCCH subframe configuration 1 and the EPDCCH subframe configuration 2 are 1 may not perform the monitoring of the PDCCH-SS.

FIG. 17 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. In this example, the monitoring of the EPDCCH is not configured. An example of the monitoring of the control channels switches first monitoring of the PDCCH-SS (monitoring of the PDCCH-SS (configuration 1)), or second monitoring of the PDCCH-SS (monitoring of the PDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

A subframe where at least one of the uplink-downlink configuration 1 and the uplink-downlink configuration 2 is D or S performs the monitoring of the control channels. In the subframes where the monitoring of the control channels is performed, the monitoring of the PDCCH-SS (configuration 1) or the monitoring of the PDCCH-SS (configuration 2) is determined based on the uplink-downlink configuration 1 and the uplink-downlink configuration 2. Of the subframes where the monitoring of the control channels is performed, a subframe where both the uplink-downlink configuration 1 and the uplink-downlink configuration 2 are D or S performs the monitoring of the PDCCH-SS (configuration 1). Of the subframes where the monitoring of the control channels is performed, a subframe where either of the uplink-downlink configuration 1 and the uplink-downlink configuration 2 is D and the other one of the uplink-downlink configuration 1 and the uplink-downlink configuration 2 is S performs the monitoring of the PDCCH-SS (configuration 1). Of the subframes where the monitoring of the control channels is performed, a subframe where either of the uplink-downlink configuration 1 and the uplink-downlink configuration 2 is U and the other one of the uplink-downlink configuration 1 and the uplink-downlink configuration 2 is D or S performs the monitoring of the PDCCH-SS (configuration 2). A subframe where both the uplink-downlink configuration 1 and the uplink-downlink configuration 2 are U does not perform the monitoring of the control channels.

The monitoring of the PDCCH-SS (configuration 1) is performed in a subframe where both the uplink-downlink configuration 1 and the uplink-downlink configuration 2 are D or S. The monitoring of the PDCCH-SS (configuration 1) is performed in a subframe where one of the uplink-downlink configuration 1 and the uplink-downlink configuration 2 is D and the other one of the uplink-downlink configuration 1 and the uplink-downlink configuration 2 is S. The monitoring of the PDCCH-SS (configuration 2) is performed in a subframe where one of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U. The monitoring of the EPDCCH-SS is not performed in all subframes.

It can be assumed that, in the mobile station devices 1, the uplink-downlink configuration 2 does not become U in a subframe where the uplink-downlink configuration 1 is D. A subframe where the uplink-downlink configuration 1 is D and the uplink-downlink configuration 2 is U may perform the monitoring of the PDCCH-SS (configuration 1) or the monitoring of the PDCCH-SS (configuration 2). A subframe where the uplink-downlink configuration 1 or the uplink-downlink configuration 2 is S and the uplink-downlink configuration 1 or the uplink-downlink configuration 2 is D or U may perform the monitoring of the PDCCH-SS (configuration 1) or the monitoring of the PDCCH-SS (configuration 2).

FIG. 18 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS or monitoring of the EPDCCH-SS for each subframe.

A subframe where at least one of the uplink-downlink configuration 1 and the uplink-downlink configuration 2 is D or S performs the monitoring of the control channels. In the subframes where the monitoring of the control channels is performed, the monitoring of the PDCCH-SS or the monitoring of the EPDCCH-SS is determined based on the uplink-downlink configuration 1 and the uplink-downlink configuration 2. Of the subframes where the monitoring of the control channels is performed, a subframe where both the uplink-downlink configuration 1 and the uplink-downlink configuration 2 are D or S performs the monitoring of the PDCCH-SS. Of the subframes where the monitoring of the control channels is performed, a subframe where either of the uplink-downlink configuration 1 and the uplink-downlink configuration 2 is D and the other one of the uplink-downlink configuration 1 and the uplink-downlink configuration 2 is S performs the monitoring of the PDCCH-SS. Of the subframes where the monitoring of the control channels is performed, a subframe where either of the uplink-downlink configuration 1 and the uplink-downlink configuration 2 is U and the other one of the uplink-downlink configuration 1 and the uplink-downlink configuration 2 is D or S performs the monitoring of the EPDCCH-SS. A subframe where both the uplink-downlink configuration 1 and the uplink-downlink configuration 2 are U does not perform the monitoring of the control channels.

The monitoring of the PDCCH-SS is performed in a subframe where both the uplink-downlink configuration 1 and the uplink-downlink configuration 2 are D or S. The monitoring of the PDCCH-SS is performed in a subframe where one of the uplink-downlink configuration 1 and the uplink-downlink configuration 2 is D and the other one of the uplink-downlink configuration 1 and the uplink-downlink configuration 2 is S. The monitoring of the EPDCCH-SS is performed in a subframe where one of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U.

It can be assumed that, in the mobile station devices 1, the uplink-downlink configuration 2 does not become U in a subframe where the uplink-downlink configuration 1 is D. A subframe where the uplink-downlink configuration 1 is D and the uplink-downlink configuration 2 is U may perform the monitoring of the PDCCH-SS or the monitoring of the EPDCCH-SS. A subframe where the uplink-downlink configuration 1 or the uplink-downlink configuration 2 is S and the uplink-downlink configuration 1 or the uplink-downlink configuration 2 is D or U may perform the monitoring of the PDCCH-SS or the monitoring of the EPDCCH-SS.

FIG. 19 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and two EPDCCH subframe configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. An EPDCCH subframe configuration 1 and/or an EPDCCH subframe configuration 2 are configured through RRC signaling as a configuration specific to the mobile station devices 1. The EPDCCH subframe configuration 1 and/or the EPDCCH subframe configuration 2 may be configured as a configuration specific to the base station device 3 (cell). The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

A subframe where at least one of the uplink-downlink configuration 1 and the uplink-downlink configuration 2 is D or S and a subframe where at least one of the EPDCCH subframe configuration 1 and the EPDCCH subframe configuration 2 is 1 perform the monitoring of the control channels. A subframe where at least one of the uplink-downlink configuration 1 and the uplink-downlink configuration 2 is D or S and both the EPDCCH subframe configuration 1 and the EPDCCH subframe configuration 2 are 0 performs the monitoring of the PDCCH-SS. A subframe where the EPDCCH subframe configuration 1 is 1 performs the monitoring of the EPDCCH-SS (configuration 1). A subframe where the EPDCCH subframe configuration 2 is 1 performs the monitoring of the EPDCCH-SS (configuration 2). A subframe where both the uplink-downlink configuration 1 and the uplink-downlink configuration 2 are U and both the EPDCCH subframe configuration 1 and the EPDCCH subframe configuration 2 are 0 does not perform the monitoring of the control channels.

The monitoring of the PDCCH-SS is performed in a subframe where at least one of the uplink-downlink configuration 1 and the uplink-downlink configuration 2 is D or S and both the EPDCCH subframe configuration 1 and the EPDCCH subframe configuration 2 are 0. The monitoring of the EPDCCH-SS (configuration 1) is performed in a subframe where the EPDCCH subframe configuration 1 is 1, without depending on the uplink-downlink configuration. The monitoring of the EPDCCH-SS (configuration 2) is performed in a subframe where the EPDCCH subframe configuration 2 is 1, without depending on the uplink-downlink configuration. The monitoring of the control channels is not performed in a subframe where both the uplink-downlink configuration 1 and the uplink-downlink configuration 2 are U and the EPDCCH subframe configuration 1 and the EPDCCH subframe configuration 2 are 0.

It may be assumed that, in the mobile station devices 1, the EPDCCH subframe configuration 1 and/or the EPDCCH subframe configuration 2 do not become 1 in a subframe where both the uplink-downlink configuration 1 and the uplink-downlink configuration 2 are U. In a subframe where both the uplink-downlink configuration 1 and the uplink-downlink configuration 2 are U, the monitoring of the control channels cannot be performed, without depending on the EPDCCH subframe configuration 1 and/or the EPDCCH subframe configuration 2.

A subframe where both the EPDCCH subframe configuration 1 and the EPDCCH subframe configuration 2 are 1 may perform the monitoring of the EPDCCH-SS (configuration 1) and the monitoring of the EPDCCH-SS (configuration 2). It may be assumed that, in the mobile station devices 1, both the EPDCCH subframe configuration 1 and the EPDCCH subframe configuration 2 do not become 1.

When both the EPDCCH subframe configuration 1 and the EPDCCH subframe configuration 2 are 1, it may be assumed that either the EPDCCH subframe configuration 1 or the EPDCCH subframe configuration 2 is 1. That is, a subframe where both the EPDCCH subframe configuration 1 and the EPDCCH subframe configuration 2 are 1 and the monitoring of the control channels is performed may perform the monitoring of the EPDCCH-SS (configuration 1) or the monitoring of the EPDCCH-SS (configuration 2). When both the EPDCCH subframe configuration 1 and the EPDCCH subframe configuration 2 are 1, it may be assumed that both the EPDCCH subframe configuration 1 and the EPDCCH subframe configuration 2 are 0. That is, a subframe where both the EPDCCH subframe configuration 1 and the EPDCCH subframe configuration 2 are 1 and the monitoring of the control channels is performed may perform the monitoring of the PDCCH-SS. A subframe where both the EPDCCH subframe configuration 1 and the EPDCCH subframe configuration 2 are 1 may not perform the monitoring of the PDCCH-SS.

The example of the subframe configuration and the monitoring of the control channels described above can be applied to monitoring of the PDCCH for one or more SSs and/or monitoring of the EPDCCH for one or more SSs. That is, when a plurality of SSs are configured for the PDCCH and/or the EPDCCH, each SS can configured or prescribe the monitoring of the control channels independently.

For example, when one SS is configured for one EPDCCH set, a subframe configuration is performed independently for each EPDCCH set. A SS corresponding to each EPDCCH set configures or prescribes the monitoring of the control channels based on each subframe configuration independently. For example, when a plurality of SSs are configured for one EPDCCH set, a subframe configuration is performed for the EPDCCH set. Each SS configures or prescribes the monitoring of the control channels based on the subframe configuration independently.

Hereinafter, an example of a subframe configuration and monitoring of control channels when a plurality of SSs are configured for the PDCCH and/or the EPDCCH will be described. In the following description, although a case where the number of SSs is two will be described, the same applies to a case where the number of SSs is equal to or greater than three. A SS1 is referred to as a first SS, and a SS2 is referred to as a second SS. For example, the type of the control channel to be monitored, the DCI format, and/or the RNTI may be different between the SSs.

The SS1 can correspond to the USS, and the SS2 can correspond to the CSS. Furthermore, the SS1 can correspond to the first USS, and the SS2 can correspond to the second USS.

FIG. 20 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and one EPD- CCH subframe configuration. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The EPDCCH subframe configuration is configured through RRC signaling as a configuration specific to the mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of a PDCCH-SS1, monitoring of an EPDCCH-SS1, monitoring of a PDCCH-SS2, or monitoring of an EPDCCH-SS2 for each subframe.

First, the monitoring of the PDCCH-SS1 and the EPDCCH-SS1 will be described. The monitoring of the PDCCH-SS1 and the EPDCCH-SS1 is switched based on the uplink-downlink configuration 1, the uplink-downlink configuration 2, and the EPDCCH subframe configuration. A subframe where at least one of the uplink-downlink configuration 1 and the uplink-downlink configuration 2 is D or S and the EPDCCH subframe configuration is 0 performs the monitoring of the PDCCH-SS1. A subframe where the EPDCCH subframe configuration is 1 performs the monitoring of the EPDCCH-SS1. A subframe where both the uplink-downlink configuration 1 and the uplink-downlink configuration 2 are U and the EPDCCH subframe configuration is 0 does not perform the monitoring of the PDCCH-SS1 and the EPDCCH-SS1.

Next, the monitoring of the PDCCH-SS2 of the EPDCCH-SS2 will be described. The monitoring of the PDCCH-SS2 and the EPDCCH-SS2 is switched based on the uplink-downlink configuration 1 and the uplink-downlink configuration 2. That is, even when the EPDCCH subframe configuration is configured, in the switching of the monitoring of the PDCCH-SS2 and the EPDCCH-SS2, the EPDCCH subframe configuration is not used. A subframe where both the uplink-downlink configuration 1 and the uplink-downlink configuration 2 are D or S performs the monitoring of the PDCCH-SS2. A subframe where one of the uplink-downlink configuration 1 and the uplink-downlink configuration 2 is D and the other one of the uplink-downlink configuration 1 and the uplink-downlink configuration 2 is S performs the monitoring of the PDCCH-SS2. A subframe where one of the uplink-downlink configuration 1 and the uplink-downlink configuration 2 is D or S and the other one of the uplink-downlink configuration 1 and the uplink-downlink configuration 2 is U performs the monitoring of the EPDCCH-SS2. A subframe where both the uplink-downlink configuration 1 and the uplink-downlink configuration 2 are U does not perform the PDCCH-SS2 and the EPDCCH-SS2.

It may be assumed that, in the mobile station devices 1, the uplink-downlink configuration 2 does not become U in a subframe where the uplink-downlink configuration 1 is D. It may be assumed that, in the mobile station devices 1, the EPDCCH subframe configuration does not become 1 in a subframe where the uplink-downlink configuration 1 and/or the uplink-downlink configuration 2 are U. In a subframe where the uplink-downlink configuration 1 and/or the uplink-downlink configuration 2 are U, the monitoring of the control channels cannot be performed, without depending on the EPDCCH subframe configuration. Even if the uplink-downlink configuration 1 and the uplink-downlink configuration 2 for a certain subframe are U, when the EPDCCH subframe configuration for the subframe is 1, the monitoring of the EPDCCH-SS1 and/or the EPDCCH-SS2 may be performed. Even if the uplink-downlink configuration 1 and/or the uplink-downlink configuration 2 for a certain subframe are U, when the EPDCCH subframe configuration for the subframe is 0, the monitoring of the PDCCH-SS1 and/or the PDCCH-SS2 may be performed.

FIG. 21 is a diagram showing an example of a subframe configuration and monitoring of control channels. In an example of FIG. 21, an independent configuration is further configured or defined for the monitoring of the EPDCCH-SS1 in the example described in FIG. 20. That is, in the monitoring of the EPDCCH-SS1, the processing or the configurations of the control channels to be monitored are further switched. Hereinafter, a difference from the description in FIG. 20 will be described.

The monitoring of the EPDCCH-SS1 is switched based on the uplink-downlink configuration 1, the uplink-downlink configuration 2, and the EPDCCH subframe configuration. A subframe where one of the uplink-downlink configuration 1 and the uplink-downlink configuration 2 is D or S, the other one of the uplink-downlink configuration 1 and the uplink-downlink configuration 2 is D or S, and the EPDCCH subframe configuration is 1 performs the first monitoring of the EPDCCH-SS (monitoring of the EPDCCH-SS (configuration 1)). A subframe where one of the uplink-downlink configuration 1 and the uplink-downlink configuration 2 is D or S, the other one of the uplink-downlink configuration 1 and the uplink-downlink configuration 2 is U, and the EPDCCH subframe configuration is 1 performs the second monitoring of the EPDCCH-SS (monitoring of the EPDCCH-SS (configuration 2)). That is, in a subframe where the EPDCCH subframe configuration is 1, the monitoring of the EPDCCH-SS1 switches the configuration 1 and the configuration 2 based on the uplink-downlink configuration 1 and the uplink-downlink configuration 2.

In the monitoring of the PDCCH-SS1, the monitoring of the PDCCH-SS2, and/or the monitoring of the EPDCCH-SS2, the processing or the configurations of the control channels to be monitored may be further switched.

FIG. 22 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and two EPDCCH subframe configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. An EPD- CCH subframe configuration 1 and/or an EPDCCH subframe configuration 2 are configured through RRC signaling as a configuration specific to the mobile station devices 1. The EPDCCH subframe configuration 1 and/or the EPDCCH subframe configuration 2 may be configured as a configuration specific to the base station device 3 (cell). The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels determines the monitoring of the PDCCH-SS1, the monitoring of the EPDCCH-SS1, the monitoring of the PDCCH-SS2, or the monitoring of the EPDCCH-SS2 for each subframe. The EPDCCH subframe configuration 1 is used for switching the monitoring of the PDCCH-SS1 and the EPDCCH-SS1. The EPDCCH subframe configuration 2 is used for switching the monitoring of the PDCCH-SS2 and the EPDCCH-SS2.

First, the monitoring of the PDCCH-SS1 and the EPDCCH-SS1 will be described. The monitoring of the PDCCH-SS1 and the EPDCCH-SS1 is switched based on the uplink-downlink configuration 1, the uplink-downlink configuration 2, and the EPDCCH subframe configuration 1. A subframe where at least one of the uplink-downlink configuration 1 and the uplink-downlink configuration 2 is D or S and the EPDCCH subframe configuration 1 is 0 performs the monitoring of the PDCCH-SS1. A subframe where the EPDCCH subframe configuration 1 is 1 performs the monitoring of the EPDCCH-SS1. A subframe where both the uplink-downlink configuration 1 and the uplink-downlink configuration 2 are U and the EPDCCH subframe configuration 1 is 0 does not perform the monitoring of the PDCCH-SS1 and the EPDCCH-SS1.

Next, the monitoring of the PDCCH-SS2 and the EPDCCH-SS2 will be described. The monitoring of the PDCCH-SS2 and the EPDCCH-SS2 is switched based on the uplink-downlink configuration 1, the uplink-downlink configuration 2, and the EPDCCH subframe configuration 2. A subframe where at least one of the uplink-downlink configuration 1 and the uplink-downlink configuration 2 is D or S and the EPDCCH subframe configuration 2 is 0 performs the monitoring of the PDCCH-SS2. A subframe where the EPDCCH subframe configuration 2 is 1 performs the monitoring of the EPDCCH-SS2. A subframe where both the uplink-downlink configuration 1 and the uplink-downlink configuration 2 are U and the EPDCCH subframe configuration 2 is 0 does not perform the monitoring of the PDCCH-SS2 and the EPDCCH-SS2.

It may be assumed that, in the mobile station devices 1, the uplink-downlink configuration 2 does not become U in a subframe where the uplink-downlink configuration 1 is D. It may be assumed that, in the mobile station device 1, the EPDCCH subframe configuration does not become 1 in a subframe where the uplink-downlink configuration 1 and/or the uplink-downlink configuration 2 are/is U. In a subframe where the uplink-downlink configuration 1 and/or the uplink-downlink configuration 2 are U, the monitoring of the control channels cannot be performed, without depending on the EPDCCH subframe configuration. Even if the uplink-downlink configuration 1 and the uplink-downlink configuration 2 for a certain subframe are U, when the EPDCCH subframe configuration for the subframe is 1, the monitoring of the EPDCCH-SS1 and/or the EPDCCH-SS2 may be performed. Even if the uplink-downlink configuration 1 and/or the uplink-downlink configuration 2 for a certain subframe are/is U, when the EPDCCH subframe configuration for the subframe is 0, the monitoring of the PDCCH-SS1 and/or the PDCCH-SS2 may be performed.

A subframe where both the EPDCCH subframe configuration 1 and the EPDCCH subframe configuration 2 are 1 may perform the monitoring of the EPDCCH-SS1 and the monitoring of the EPDCCH-SS2. It may be assumed that, in the mobile station devices 1, both the EPDCCH subframe configuration 1 and the EPDCCH subframe configuration 2 do not become 1. When both the EPDCCH subframe configuration 1 and the EPDCCH subframe configuration 2 are 1, it may be assumed that either the EPDCCH subframe configuration 1 or the EPDCCH subframe configuration 2 is 1. That is, a subframe where both the EPDCCH subframe configuration 1 and the EPDCCH subframe configuration 2 are 1 and the monitoring of the control channels is performed may perform the monitoring of the EPDCCH-SS1 or the monitoring of the EPDCCH-SS2. When both the EPDCCH subframe configuration 1 and the EPDCCH subframe configuration 2 are 1, it may be assumed that both the EPDCCH subframe configuration 1 and the EPDCCH subframe configuration 2 are 0. That is, a subframe where both the EPDCCH subframe configuration 1 and the EPDCCH subframe configuration 2 are 1 and the monitoring of the control channels is performed may perform the monitoring of the PDCCH-SS1 and/or the PDCCH-SS2. A subframe where both the EPDCCH subframe configuration 1 and the EPDCCH subframe configuration 2 are 1 may not perform the monitoring of the PDCCH-SS1 and/or the PDCCH-SS2.

Figure 23:
FIG. 23 is a diagram showing an example of a subframe configuration and monitoring of control channels.

FIG. 23 is a diagram showing an example of a subframe configuration and monitoring of control channels. In the example of FIG. 23, an independent configuration is further configured or defined for the monitoring of the EPDCCH-SS1 in the example described in FIG. 22. That is, in the monitoring of the EPDCCH-SS1, the processing or the configurations of the control channels to be monitored are further switched. Hereinafter, a difference from the description in FIG. 22 will be described.

The monitoring of the EPDCCH-SS1 is switched based on the uplink-downlink configuration 1, the uplink-downlink configuration 2, and the EPDCCH subframe configuration 1. A subframe where one of the uplink-downlink configuration 1 and the uplink-downlink configuration 2 is D or S, the other one of the uplink-downlink configuration 1 and the uplink-downlink configuration 2 is D or S, and the EPDCCH subframe configuration 1 is 1 performs the first monitoring of the EPDCCH-SS (monitoring of the EPDCCH-SS (configuration 1)). A subframe where one of the uplink-downlink configuration 1 and the uplink-downlink configuration 2 is D or S, the other one of the uplink-downlink configuration 1 and the uplink-downlink configuration 2 is U, and the EPDCCH subframe configuration is 1 performs the second monitoring of the EPDCCH-SS (monitoring of the EPDCCH-SS (configuration 2)). That is, in a subframe where the EPDCCH subframe configuration is 1, the monitoring of the EPDCCH-SS1 switches the configuration 1 and the configuration 2 based on the uplink-downlink configuration 1 and the uplink-downlink configuration 2.

In the monitoring of the PDCCH-SS1, the monitoring of the PDCCH-SS2, and/or the monitoring of the EPDCCH-SS2, the processing or the configurations of the control channels to be monitored may be further switched.

A subframe where one of the uplink-downlink configuration 1 and the uplink-downlink configuration 2 is D or S and the other one of the uplink-downlink configuration 1 and the uplink-downlink configuration 2 is U is referred to as a flexible subframe. For example, the flexible subframe is a subframe where an uplink subframe or a downlink subframe can be dynamically switched. That is, the base station device 3 can dynamically determine the flexible subframe as an uplink subframe or a downlink subframe in consideration of a load of communication. For this reason, the base station device 3 can implement efficiency communication. For example, when the monitoring of the control channels is performed in the flexible subframe, the mobile station devices 1 may recognize the subframe as a downlink subframe. When the transmission of an uplink channel and/or an uplink signal in the flexible subframe is instructed, the mobile station devices 1 may recognize the subframe as an uplink subframe. When the flexible subframe is recognized as an uplink subframe, the mobile station devices 1 can configure or prescribe such that the monitoring of the control channels is not performed in the subframe. A subframe where one of the uplink-downlink configuration 1 and the uplink-downlink configuration 2 is D or S and the other one of the uplink-downlink configuration 1 and the uplink-downlink configuration 2 is D or S is referred to as a fixed subframe.

A mobile station device of the related art which cannot recognize the flexible subframe can recognize the flexible subframe as an uplink subframe. The mobile station device of the related art which cannot recognize the flexible subframe may not perform transmission and reception processing when an uplink channel and/or an uplink signal is not indicated in the subframe. With this, the base station device 3 which uses the flexible subframe can implement communication with a mobile station device which can recognize the flexible subframe and a mobile station device which cannot recognize the flexible subframe.

The uplink-downlink configuration can be configured using the uplink reference UL-DL configuration, the downlink reference UL-DL configuration, and/or the transmission direction UL-DL configuration. Hereinafter, the uplink reference UL-DL configuration, the downlink reference UL-DL configuration, and the transmission direction UL-DL configuration will be described.

The uplink reference UL-DL configuration, the downlink reference UL-DL configuration, and the transmission direction UL-DL configuration are defined by the uplink-downlink configuration (UL-DL configuration).

That is, the uplink reference UL-DL configuration, the downlink reference UL-DL configuration, and the transmission direction UL-DL configuration are defined by the patterns of a downlink subframe, an uplink subframe, and a special subframe in a radio frame.

The uplink reference UL-DL configuration is referred to as a first parameter, a first configuration, or a serving cell uplink-downlink configuration. The downlink reference UL-DL configuration is referred to as a second parameter or a second configuration. The transmission direction UL-DL configuration is referred to as a third parameter or a third configuration.

When an uplink-downlink configuration i is configured as the uplink reference UL-DL configuration, this is referred to as that an uplink reference UL-DL configuration i is configured. When the uplink-downlink configuration i is configured as the downlink reference UL-DL configuration, this is referred to as that a downlink reference UL-DL configuration i is configured. When the uplink-downlink configuration i is configured as the transmission direction UL-DL configuration, this is referred to as that a transmission direction UL-DL configuration i is configured.

Hereinafter, a setting method of the uplink reference UL-DL configuration, the downlink reference UL-DL configuration, and the transmission direction UL-DL configuration will be described.

The base station device 3 configures the uplink reference UL-DL configuration, the downlink reference UL-DL configuration, and the transmission direction UL-DL configuration. The base station device 3 may transmit first information (TDD-Config) representing the uplink reference UL-DL configuration, second information representing the downlink reference UL-DL configuration, and third information representing the transmission direction UL-DL configuration included in at least one of a MIB, a system information block type 1 message, a system information message, an RRC message, a MAC CE (Control Element), and control information (for example, DCI format) of a physical layer. The base station device 3 may include the first information, the second information, and the third information in any of the MIB, the system information block type 1 message, the system information message, the RRC message, the MAC CE (Control Element), and the control information (for example, DCI format) of the physical layer.

The uplink reference UL-DL configuration, the downlink reference UL-DL configuration, and the transmission direction UL-DL configuration may be defined for each of a plurality of serving cells.

The base station device 3 transmits the first information, the second information, and the third information of each serving cell to the mobile station devices 1 in which a plurality of serving cells are configured. The first information, the second information, the third information may be defined for each serving cell.

The base station device 3 may transmit, to the mobile station devices 1 in which two serving cells of one primary cell and one secondary cell are configured, first information for the primary cell, second information for the primary cell, third information for the primary cell, first information for the secondary cell, second information for the secondary cell, and third information for the secondary cell.

The mobile station devices 1 in which a plurality of serving cells are configured may configure an uplink reference UL-DL configuration, a downlink reference UL-DL configuration, and a transmission direction DL-UL configuration based on the first information, the second information, and the third information for each serving cell.

The mobile station devices 1 in which two serving cells of one primary cell and one secondary cell are configured may configure the uplink reference UL-DL configuration for the primary cell, the downlink reference UL-DL configuration for the primary cell, the transmission direction DL-UL configuration for the primary cell, the uplink reference UL-DL configuration for the secondary cell, the downlink reference UL-DL configuration for the secondary cell, and the transmission direction DL-UL configuration for the secondary cell.

It is preferable that the first information for the primary cell is included in the system information block type 1 message or the RRC message. It is preferable that the first information for the secondary cell is included in the RRC message. It is preferable that the second information for the primary cell is included in the system information block type 1 message, the system information message, or the RRC message. It is preferable that the second information for the secondary cell is included in the RRC message. It is preferable that the third information is included in the control information (for example, DCI format) of the physical layer.

It is preferable that the first information is common to a plurality of mobile station devices 1 in a cell. The second information may be common to a plurality of mobile station devices 1 in a cell or may be dedicated for the mobile station device 1. The third information may be common to a plurality of mobile station devices 1 in a cell or may be dedicated for the mobile station device 1.

The system information block type 1 message is subjected to initial transmission through the PDSCH in a subframe 5 of a radio frame satisfying SFN mod 8=0 and retransmission (repetition) in a subframe 5 of other radio frames satisfying SFN mod 2=0. The system information block type 1 message includes information representing the configuration (the length of DwPTS, GP, and UpPTS) of the special subframe. The system information block type 1 message is information specific to a cell.

The system information message is transmitted through the PDSCH. The system information message is information specific to a cell. The system information message includes a system information block X other than a system information block type 1.

The RRC message is transmitted through the PDSCH. The RRC message is information/signal which is processed in an RRC layer. The RRC message may be common to a plurality of mobile station devices 1 in a cell or may be dedicated for a specific mobile station device 1.

The MAC CE is transmitted through the PDSCH. The MAC CE is information/signal which is processed in a MAC layer.

FIG. 10 is a flowchart showing a setting method of an uplink reference UL-DL configuration and a downlink reference UL-DL configuration in this embodiment. The mobile station devices 1 execute the setting method in FIG. 10 for each of a plurality of serving cells.

The mobile station devices 1 configure the uplink reference UL-DL configuration based on the first information for a certain serving cell (S1000). The mobile station devices 1 determine whether or not the second information for the certain serving cell is received (S1002). When the second information for the certain serving cell is received, the mobile station devices 1 configure, to the certain serving cell, the downlink reference UL-DL configuration based on the second information for the certain serving cell (S1006). When the second information of the certain serving cell is not received (else/otherwise), the mobile station devices 1 configure the downlink reference UL-DL configuration based on the first information of the certain serving cell for the certain serving cell (S1004).

A serving cell where the uplink reference UL-DL configuration and the downlink reference UL-DL configuration are configured based on the first information is referred to as a serving cell where dynamic TDD is not configured. A serving cell where the downlink reference UL-DL configuration is configured based on the second information is referred to as a serving cell where the dynamic TDD is configured.

The mobile station devices 1 receive the second information and determine a subframe where the transmission of the uplink signal is possible based on the second information. Next, the mobile station devices 1 monitor the third information. When the third information is received, the mobile station devices 1 determine a subframe where the transmission of the uplink signal is possible based on the third information.

Hereinafter, the uplink reference UL-DL configuration will be described.

The uplink reference UL-DL configuration is used at least for specifying a subframe where uplink transmission is possible or impossible in a serving cell.

The mobile station devices 1 do not perform the uplink transmission in a subframe which is indicated as a downlink subframe by the uplink reference UL-DL configuration. The mobile station devices 1 do not perform the uplink transmission in the DwPTS and the GP of a subframe which is indicated as a special subframe by the uplink reference UL-DL configuration.

Hereinafter, the downlink reference UL-DL configuration will be described.

The downlink reference UL-DL configuration is used at least for specifying a subframe where downlink transmission is possible or impossible in a serving cell.

The mobile station devices 1 do not perform the downlink transmission in a subframe which is indicated as an uplink subframe by the downlink reference UL-DL configuration. The mobile station devices 1 do not perform the downlink transmission in the UpPTS and the GP of a subframe which is indicated as a special subframe by the downlink reference UL-DL configuration.

The mobile station devices 1 in which the downlink reference UL-DL configuration is configured based on the first information may perform measurement (for example, measurement concerning channel state information) using the downlink signal in the DwPTS of the downlink subframe or the special subframe indicated by the uplink reference UL-DL configuration or the downlink reference UL-DL configuration.

The base station device 3 determines the downlink reference UL-DL configuration from a configuration set (set of configurations) restricted based on the uplink reference UL-DL configuration. That is, the downlink reference UL-DL configuration is an element in a configuration set restricted based on the uplink reference UL-DL configuration. The configuration set restricted based on the uplink reference UL-DL configuration includes an uplink-downlink configuration satisfying conditions (a) to (c) of FIG. 11. FIG. 11 is a diagram showing the relationship between the subframe indicated by the uplink reference UL-DL configuration and the subframe indicated by the downlink reference UL-DL configuration in this embodiment. In FIG. 11, D represents a downlink subframe, U represents an uplink subframe, and S represents a special subframe.

With this, in the dynamic TDD, since the DwPTS of the subframe indicated as a downlink subframe by the uplink reference UL-DL configuration and the special subframe are not used for the uplink transmission, the mobile station devices 1 in which the downlink reference UL-DL configuration is set based on the first information can appropriately perform measurement using the downlink signal.

The mobile station devices 1 in which the downlink reference UL-DL configuration is configured based on the second information may perform measurement (for example, measurement concerning channel state information) using the downlink signal in the DwPTS of the downlink subframe or the special subframe indicated by the uplink reference UL-DL configuration.

A subframe which is indicated as an uplink subframe by the uplink reference UL-DL configuration and is indicated as a downlink subframe by the downlink reference UL-DL configuration is referred to as a first flexible subframe. The first flexible subframe is a subframe which is reserved for the uplink and downlink transmission.

A subframe which is indicated as a special subframe by the uplink reference UL-DL configuration and is indicated as a downlink subframe by the downlink reference UL-DL configuration is referred to as a second flexible subframe. The second flexible subframe is a subframe which is reserved for the downlink transmission. The second flexible subframe is a subframe which is reserved for the downlink transmission in the DwPTS and the uplink transmission in the UpPTS.

Hereinafter, the transmission direction UL-DL configuration will be described in detail.

The mobile station devices 1 and the base station device 3 configure the transmission direction UL-DL configuration concerning the direction (upward/downward) of transmission in a subframe. The transmission direction UL-DL configuration is used to determine the direction of transmission in a subframe.

The mobile station devices 1 control transmission in the first flexible subframe and the second flexible subframe based on scheduling information (DCI format and/or HARQ-ACK) and the transmission direction UL-DL configuration.

The base station device 3 transmits the third information representing the transmission direction UL-DL configuration to the mobile station devices 1. The third information is information indicating a subframe where the uplink transmission is possible. The third information is information indicating a subframe where the downlink transmission is possible. The third information is information indicating a subframe where the uplink transmission is possible in the UpPTS and the downlink transmission is possible in the DwPTS.

For example, the transmission direction UL-DL configuration is used to specify the direction of transmission in a subframe which is indicated as an uplink subframe by the uplink reference UL-DL configuration and is indicated as a downlink subframe by the downlink reference UL-DL configuration and/or a subframe which is indicated as a special subframe by the uplink reference UL-DL configuration and is indicated as a downlink subframe by the downlink reference UL-DL configuration. That is, the transmission direction UL-DL configuration is used to specify the direction of transmission in a subframe which is indicated as different subframes in the uplink reference UL-DL configuration and the downlink reference UL-DL configuration.

An example where, in the monitoring of the control channels corresponding to different control channels, different search spaces, and/or different configurations, the processing or the configurations of the control channels can be made different or independent has been described. Hereinafter, another example of the processing or the configurations in the monitoring of the control channels will be described. Hereinafter, although description will be provided as to first monitoring and second monitoring, the first monitoring and the second monitoring include the monitoring of the control channels corresponding to different control channels, different search spaces, and/or different configurations.

Another example of the processing or the configurations in the monitoring of the control channels is processing or a configuration concerning a PUCCH resource of HARQ response information (HARQ-ACK). The HARQ response information includes response information to PDSCH transmission indicated by detection of the control channels and response information to the control channels including control information indicating SPS (semi-persistent scheduling) release (end). The HARQ response information represents ACK indicating that reception could be normally performed, NACK indicating that reception could not be normally performed, and/or DTX indicating that transmission is not performed (reception is not performed).

The mobile station devices 1 transmit the HARQ response information to the base station device 3 through the PUCCH and/or the PUSCH. The base station device 3 receives the HARQ response information from the mobile station device 1 through the PUCCH and/or the PUSCH. With this, the base station device 3 understands whether or not the mobile station devices 1 could correctly receive the PDSCH or the control channels.

Next, a PUCCH resource constituted in the base station device 3 will be described. The HARQ response information spreads to a SC-FDMA sample region using a cyclically shifted pseudo CAZAC (Constant-Amplitude Zero-Auto-Correlation) sequence and further spreads to 4 SC-FDMA symbols in a slot using an orthogonal code OCC (Orthogonal Cover Code) having a code length of 4. The symbols spread by two codes are mapped to two RBs having different frequencies. In this way, the PUCCH resource is defined by three elements of a cyclic shift amount, an orthogonal code, and/or RBs to be mapped. The cyclic shift in the SC-FDMA sample region may be expressed by phase rotation which increases uniformly in the frequency domain.

An uplink control channel region (PUCCH region) which is used for PUCCH transmission is constituted using a predetermined number of RB pairs which are RB pairs at both ends of an uplink system bandwidth. A physical resource which is used for the PUCCH transmission is constituted by two RBs having different frequencies between a first slot and a second slot. The physical resource which is used for the PUCCH transmission is expressed by m (m=0, 1, 2, . . . ). One PUCCH is allocated in a physical resource which is used for any PUCCH transmission. With this, since one PUCCH is transmitted using resources having different frequencies, a frequency diversity effect is obtained.

A PUCCH resource (uplink control channel logical resource) which is a resource for PUCCH transmission is defined using an orthogonal code, a cyclic shift amount, and/or a frequency resource. For example, a PUCCH resource can be used when it is assumed that the elements constituting the PUCCH resource are three orthogonal codes of OC0, OC1, and OC2, six cyclic shift amounts of CS0, CS2, CS4, CS6, CS8, and CS10, and m representing the frequency resource. Each combination of the orthogonal code, the cyclic shift amount, and m is defined uniquely corresponding to nPUCCH which is an index representing the PUCCH resource (uplink control channel logical resource). The index representing the PUCCH resource is referred to as a PUCCH resource number. The correspondence of the nPUCCH, the orthogonal code, the cyclic shift amount, and m is an example, and other correspondences may be used. For example, the cyclic shift amount or m may be correlated to change among the consecutive nPUCCHs. The cyclic shift amounts CS1, CS3, CS5, CS7, CS9, and CS11 different from CS0, CS2, CS4, CS6, CS8, and CS10 may be used. Here, a case where the value of m is equal to or greater than NF2. Frequency resources having m less than NF2 are NF2 frequency resources which are reserved for PUCCH transmission to feed back the channel state information.

Next, a transmission mode which is used to transmit the HARQ response information will be described. In regards to the HARQ response information prescribes, various transmission modes (transmission methods) are defined. The transmission mode which is used to transmit the HARQ response information is determined by information or the configuration specific to the base station device 3, information or the configuration specific to the mobile station devices 1, information concerning the PDCCH corresponding to the HARQ response information, the configuration of the higher layer, and the like. The transmission mode which is used to transmit the HARQ response information is HARQ response information bundling (HARQ-ACK bundling) and HARQ response information multiplexing (HARQ-ACK multiplexing).

There is a case where a plurality of pieces of HARQ response information are transmitted in a certain uplink subframe. The number of kinds of HARQ response information transmitted in a certain uplink subframe is determined by the number of code words (transport blocks) transmitted by one PDSCH, the subframe configuration, and/or the configuration of carrier aggregation. For example, one PDSCH can transmit a maximum of two code words by MIMO (Multi Input Multi Output) transmission, and the HARQ response information is generated for each code word. For example, in the TDD, the type of the subframe is determined based on the subframe configuration. For this reason, in a certain uplink subframe, when the HARQ response information to the PDSCH transmission is transmitted in a plurality of downlink subframes, a plurality of pieces of HARQ response information to the code words of the PDSCH in each downlink subframe are generated. For example, when carrier aggregation is configured by a plurality of cells, a plurality of pieces of HARQ response information to the code words of the PDSCH transmitted by each cell are generated.

When a plurality of pieces of HARQ response information are transmitted in a certain uplink subframe, these kinds of HARQ response information are transmitted using HARQ response information bundling and/or HARQ response information multiplexing.

The HARQ response information bundling performs logical operation to a plurality of pieces of HARQ response information. The HARQ response information bundling can be performed in various units. For example, the HARQ response information bundling is performed for all code words in a plurality of downlink subframes. The HARQ response information bundling is performed for all code words in one downlink subframe. The HARQ response information bundling can reduce the amount of the HARQ response information. The HARQ response information multiplexing performs multiplexing on a plurality of pieces of HARQ response information. Information subjected to the HARQ response information bundling may be further multiplexed. In the following description, information subjected to the HARQ response information bundling is simply referred to as HARQ response information.

In regards to the PUCCH which transmits the HARQ response information, a plurality of formats can be defined. The PUCCH format to transmit the HARQ response information is a PUCCH format 1a, a PUCCH format 1b, a PUCCH format 1b with channel selection (PUCCH 1*b* with channel selection), a PUCCH format 3, or the like. The transmission mode which is used to transmit the HARQ response information includes the PUCCH format to be transmitted.

The PUCCH format 1a is a PUCCH format which is used to transmit one bit of HARQ response information. When the HARQ response information is transmitted in the PUCCH format 1a, one PUCCH resource is allocated, and the HARQ response information is transmitted using the PUCCH resource.

The PUCCH format 1b is a PUCCH format which is used to transmit two bits of HARQ response information. When the HARQ response information is transmitted in the PUCCH format 1b, one PUCCH resource is allocated, and the HARQ response information is transmitted using the PUCCH resource.

The PUCCH format 1b with channel selection is a PUCCH format which is used to transmit two, three, or four bits of HARQ response information. In regards to the PUCCH format which is used to transmit the two, three, or four bits of HARQ response information, two, three, or four PUCCH resources (channels) are configured. In the channel selection, any of a plurality of configured PUCCH resources is selected, and the selected PUCCH resource is used as a part of information. Two bits of information which can be transmitted in the selected PUCCH resource are used as a part of information. That is, in the PUCCH format 1b with channel selection, the two, three, or four bits of HARQ response information are transmitted using a combination of the PUCCH resource selected from the plurality of configured PUCCH resources and the two bits of information which can be transmitted to the selected PUCCH resource. The combination and each piece of HARQ response information are defined in advance. For example, when carrier aggregation is not configured, the two, three, or four bits of HARQ response information is HARQ response information to PDSCH transmission by two, three, or four downlink subframes.

The PUCCH format 3 is a PUCCH format which is used to transmit a maximum of 20 bits of HARQ response information. In the PUCCH format 3, one PUCCH resource is configured. In the PUCCH format 3, one PUCCH resource transmits a maximum of 20 bits of HARQ response information. The PUCCH resource in the PUCCH format 1a/1b and the PUCCH resource in the PUCCH format 3 are independent. For example, it is preferable that the base station device 3 configures such that the PUCCH resource in the PUCCH format 1a/1b and the PUCCH resource in the PUCCH format 3 are constituted using different physical resources (that is, two RBs constituting a physical resource for PUCCH transmission).

When the HARQ response information is transmitted using the PUCCH, the HARQ response information is mapped to the PUCCH resource configured explicitly and/or implicitly and transmitted. The PUCCH resource which is used to transmit the HARQ response information is determined uniquely by information or the configuration specific to the base station device 3, information or the configuration specific to the mobile station devices 1, and/or, information concerning the PDCCH or the EPDCCH corresponding to the HARQ response information, and the like. For example, the PUCCH resource number which represents the PUCCH resource to be used to transmit the HARQ response information is calculated using parameters included in information and/or parameter obtained from information, and a predetermined method (arithmetic operation).

The PUCCH resource which is used to transmit the HARQ response information can be configured independently for the respective monitoring of the control channels. For example, in the first monitoring and the second monitoring, the PUCCH resource which is used to transmit the HARQ response information can be determined using different methods (arithmetic operations) and/or parameters which can be configured independently.

Figure 24:
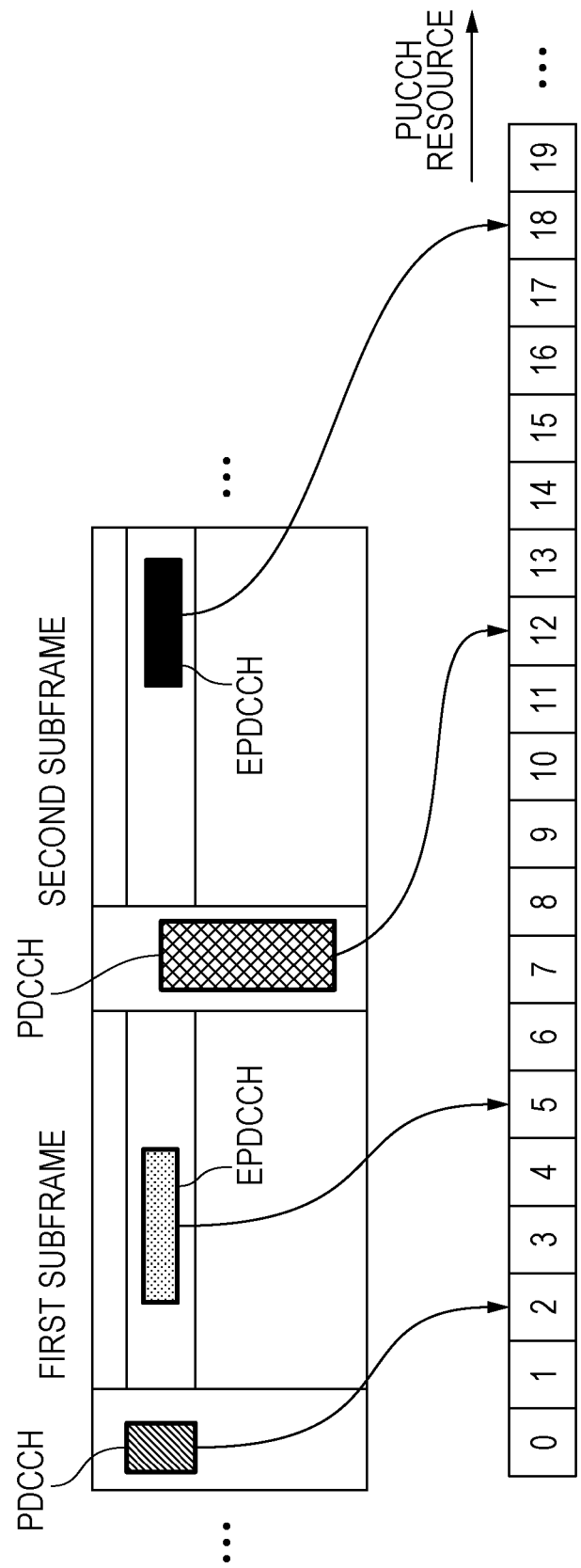
FIG. 24 is a diagram showing an example of allocation of a PUCCH resource for transmitting HARQ response information.

FIG. 24 is a diagram showing an example of allocation of a PUCCH resource for transmitting HARQ response information. The PUCCH resource of FIG. 24 is included in one uplink subframe. In this example, the monitoring of the control channels is monitoring of a PDCCH in a first subframe, monitoring of an EPDCCH in the first subframe, monitoring of a PDCCH in a second subframe, and monitoring of an EPDCCH in the second subframe. For example, the first subframe is a fixed subframe, and the second subframe is a flexible subframe. The PUCCH resources starting with the PUCCH resource number 0 are defined.

In the respective monitoring, when a control channel is detected, a PUCCH resource which is used to transmit HARQ response information for PDSCH transmission scheduled in the control channel is determined for the control channel. For example, the PUCCH resource number of the PDCCH in the first subframe is 2, the PUCCH resource number of the EPDCCH in the first subframe is 5, the PUCCH resource number of the PDCCH in the second subframe is 12, and the PUCCH resource number of the EPDCCH in the second subframe is 18.

A first method (arithmetic operation) which determines a PUCCH resource used to transmit HARQ response information implicitly determines a PUCCH resource number based on other parameters. For example, the PUCCH resource is determined using at least a nCCE or a nECCE and a parameter set by the higher layer. Specifically, the PUCCH resource number is obtained by adding at least the nCCE or the nECCE and the parameter set by the higher layer. The nCCE and the nECCE are indexes concerning resources used to transmit a PDCCH corresponding to PDSCH transmission represented by the HARQ response information. The nCCE is a first CCE number which is used for transmission of the PDCCH corresponding to PDSCH transmission represented by the HARQ response information (that is, the lowest CCE index which is used to construct the PDCCH). The nECCE is a first ECCE number which is an ECCE number in an EPDCCH set and is used for transmission of an EPDCCH corresponding to PDSCH transmission represented by the HARQ response information (that is, the lowest ECCE index which is used to construct the EPDCCH).

In the first method, a parameter which is used to determine a PUCCH resource and is configured by the higher layer can be configured independently for the respective monitoring of the control channels. For example, the parameter configured by the higher layer can be configured different among the respective monitoring such that the PUCCH resources are different among the respective monitoring. For example, efficient transmission of HARQ response information becomes possible.

In the first method, a PUCCH resource may be determined further using the number of CCEs or the number of ECCEs in other subframes. In a certain uplink subframe, when a plurality of pieces of HARQ response information are multiplexed in a plurality of downlink subframes, it is preferable that the PUCCH resources which are used to transmit the HARQ response information do not overlap among the downlink subframes. For this reason, in the determination of the PUCCH resource number, the number of CCEs or the number of ECCEs in other subframes is used, whereby it is possible to avoid a PUCCH resource which is likely to be used in other subframes. The number of CCEs in other subframes depends on the downlink bandwidth which is expressed by the number of physical resource blocks. Other subframes are not necessarily all downlink subframes corresponding to the HARQ response information to be multiplexed in a certain uplink subframe, and may be downlink subframes depending on the order of the multiplexing. For example, in a certain uplink subframe, when four pieces of HARQ response information are multiplexed in four downlink subframes, the PUCCH resource in the third downlink subframe is determined further using the number of CCEs or the number of ECCEs in the first and second subframes to avoid the PUCCH resources in the first and second downlink subframes.

A method (arithmetic operation) which uses the number of CCEs or the number of ECCEs in other subframes may be different based on the monitoring of the control channels. For example, the number of CCEs or the number of ECCEs in other subframes when determining the PUCCH resource in the first monitoring may be different between a subframe where the first monitoring is performed and a subframe where the second monitoring is performed. Specifically, in regards to the number of CCEs or the number of ECCEs in other subframes when determining the PUCCH resource in the first monitoring, in a subframe where the first monitoring is performed, the number of CCEs or the number of ECCEs in the subframe may be used, and in a subframe where the second monitoring is performed, 0 may be used. In regards to the number of CCEs or the number of ECCEs in other subframes when determining the PUCCH resource in the second monitoring, in a subframe where the second monitoring is performed, the number of CCEs or the number of ECCEs in the subframe may be used, and in a subframe where the first monitoring is performed, 0 may be used. With this, the PUCCH resource in the subframe where the first monitoring is performed and the PUCCH resource in the subframe where the second monitoring is performed can be allocated locally. For this reason, it is possible to improve the use efficiency of the PUCCH resources. In particular, when the subframe where the first monitoring is performed is a fixed subframe and the subframe where the second monitoring is performed is a flexible subframe, the PUCCH resource in the fixed subframe can be used in common by a mobile station device which can recognize the flexible subframe and a mobile station device which cannot recognize the flexible subframe. The PUCCH resource in the flexible subframe can be used only for a mobile station device which can recognize the flexible subframe.

In regards to the number of CCEs or the number of ECCEs in other subframes when determining the PUCCH resource in the first monitoring, the number of CCEs or the number of ECCEs assumed to be a subframe where the first monitoring is performed may be used even in a subframe where the second monitoring is performed. Even in a subframe which is configured as a subframe where the PDCCH and/or the EPDCCH are not monitored by the EPDCCH subframe configuration, if the subframe is a flexible subframe, in regards to number of CCEs or the number of ECCEs in other subframes when determining the PUCCH resource, the number of CCEs or the number of ECCEs in the subframe is assumed and used.

In the first method, the PUCCH resource may be determined further using ARO (HARQ-ACK Resource Offset). The ARO is the offset of the PUCCH resource. The value of the ARO is selected from a plurality of values defined in advance by an ARO field of the DCI transmitted by the PDCCH or the EPDCCH. For example, the ARO field can notify of two bits of information (ARO), and four values of the ARO are defined. For example, the value of the ARO defined in advance is 0, −1, −2, or 2.

Figure 25:
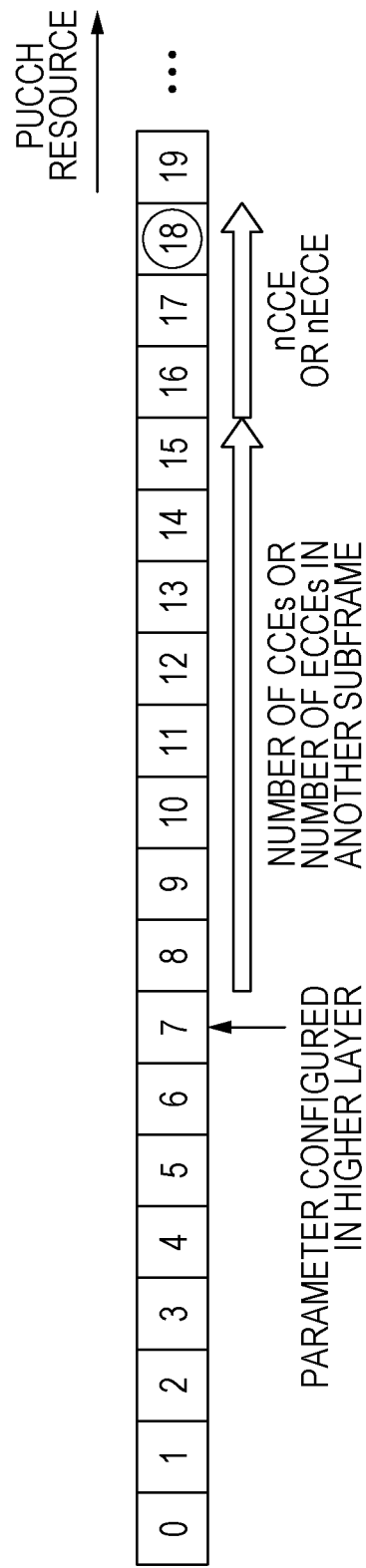
FIG. 25 is a diagram showing an example of a first method which determines a PUCCH resource used to transmit HARQ response information.

FIG. 25 is a diagram showing an example of a first method which determines a PUCCH resource used to transmit HARQ response information. The PUCCH resource of FIG. 25 is included in one uplink subframe. In this example, the PUCCH resource which is used to transmit the HARQ response information is determined using a nCCE or a nECCE, a parameter set by the higher layer, the number of CCEs or the number of ECCEs in other subframes, and the ARO. The PUCCH resource number is calculated by adding the nCCE or nECCE, the parameters configured by the higher layer, the number of CCEs or the number of ECCEs in other subframes, and the value of the ARO. When the parameter configured by the higher layer is 7, the number of CCEs or the number of ECCEs in other subframes is 8, the nCCE or the nECCE is 3, and the value of the ARO is 0, the PUCCH resource number is 18.

A second method (arithmetic operation) which determines a PUCCH resource used to transmit HARQ response information explicitly determines a PUCCH resource number. For example, the PUCCH resource is determined by one parameter configured by the higher layer. For example, the PUCCH resource is determined by one parameter selected by the PDCCH or the EPDCCH selected from a plurality of parameters configured by the higher layer. For example, the parameter configured by the higher layer is one of 0 to 2047. In regards to the determination of the PUCCH resource in the PUCCH format 3, only the second method may be used.

In the second method, one or a plurality of parameters configured by the higher layer can be configured independently for the respective monitoring of the control channels.

In the second method, one method which selects one parameter from a plurality of parameters configured by the higher layer by a PDCCH or an EPDCCH uses the ARO field of the DCI transmitted by a PDCCH or an EPDCCH. In the second method, when determining the PUCCH resource which is used to transmit the HARQ response information, the value of the ARO field is used to select one parameter from a plurality of parameters configured by the higher layer. That is, the PUCCH resource which is used to transmit the HARQ response information is determined by a plurality of parameters configured by the higher layer and the ARO field of the DCI transmitted by a related PDCCH or EPDCCH.

In the second method, another method which select one parameter from a plurality of parameters configured by the higher layer by a PDCCH or an EPDCCH uses a TPC command field of the DCI transmitted by a PDCCH or an EPDCCH. The TPC command field is used to notify of information (TPC command) for transmission power control. In the second method, the value of the TPC command field is used to select one parameter from a plurality of parameters configured by the higher layer. That is, the PUCCH resource which is used to transmit the HARQ response information is determined by a plurality of parameters configured by the higher layer and the TPC command field of the DCI transmitted by the related PDCCH or EPDCCH.

In the second method, a further method which selects one parameter from a plurality of parameters configured by the higher layer by the PDCCH or the EPDCCH uses the TPC command field of the DCI transmitted by the PDCCH and uses the ARO field of the DCI transmitted by the EPDCCH. That is, in the second method, when the DCI is received by the PDCCH, the TPC command field of the DCI may be used to select one parameter from a plurality of parameters configured by the higher layer, and when the DCI is received by the EPDCCH, the ARO field of the DCI may be used to select one parameter from a plurality of parameters configured by the higher layer.

Figure 26:
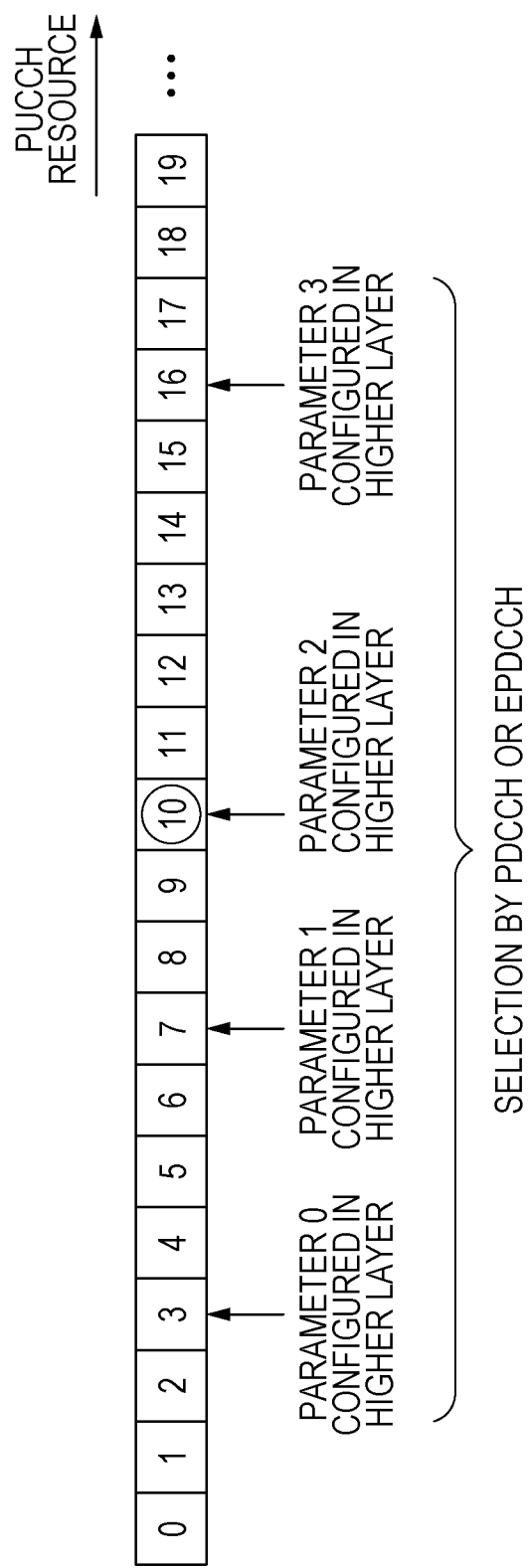
FIG. 26 is a diagram showing an example of a second method which determines a PUCCH resource used to transmit HARQ response information.

FIG. 26 is a diagram showing an example of a second method which determines a PUCCH resource used to transmit HARQ response information. The PUCCH resource of FIG. 24 is included in one uplink subframe. In this example, the PUCCH resource which is used to transmit the HARQ response information is determined by four parameters configured by the higher layer and a PDCCH or an EPDCCH which selects one parameter from a plurality of parameters. Parameters 0, 1, 2, and 3 configured by the higher layer are respectively PUCCH resources 3, 7, 10, and 16, and when the PDCCH or the EPDCCH select the parameter 2 configured by the higher layer, the PUCCH resource 10 is determined.

As described above, in different kinds of monitoring of the control channels, the PUCCH resource which is used to transmit the HARQ response information can be determined using different methods (arithmetic operations) and/or parameters which can be configured independently.

For example, the first monitoring uses the first method which determines the PUCCH resource used to transmit the HARQ response information, and the second monitoring uses the second method which determines the PUCCH resource used to transmit the HARQ response information. When the subframe where the first monitoring is performed is a fixed subframe and the subframe where the second monitoring is performed is a flexible subframe, the PUCCH resource which is used to transmit the HARQ response information can be configured independently according to the type of the subframe. For this reason, the PUCCH resource in the fixed subframe can be used in common by a mobile station device which can recognize the flexible subframe and a mobile station device which cannot recognize the flexible subframe. The PUCCH resource in the flexible subframe can be used only for a mobile station device which can recognize the flexible subframe. In particular, when a mobile station device which can recognize the flexible subframe and a mobile station device which cannot recognize the flexible subframe are accommodated in one cell, it is possible to improve the use efficiency of the PUCCH resources.

In the above description, an example where the methods which determine the PUCCH resource used to transmit the HARQ response information can be configured independently in different kinds of monitoring of the control channels including different subframe configurations has been described. As another example, in the method which determines the PUCCH resource used to transmit the HARQ response information, the unit of processing can be configured independently for different kinds of monitoring of the control channels. For example, M can be configured independently in different kinds of monitoring of the control channels. M is the number of pieces of HARQ response information to be multiplexed and is determined according to the configuration of the subframe or carrier aggregation corresponding to the HARQ response information to be multiplexed. Specifically, when the number of subframes corresponding to the HARQ response information to be multiplexed is 3, the first and third subframes are fixed subframes, and the second subframe is a flexible subframe, the number M1 of pieces of HARQ response information in the fixed subframe is 2, and the number M2 of pieces of HARQ response information in the flexible subframe is 1. The determination of the PUCCH resource used to transmit the HARQ response information in the fixed subframe and the flexible subframe is processed independently based on M1 and M2.

The first method or the second method may be used for the PUCCH format 1a/1b, and the second method may be used for the PUCCH format 3. Hereinafter, the operation of the mobile station devices 1 in which a plurality of parameters to the PUCCH format 1a/1b and a plurality of parameters to the PUCCH format 3 are configured by the higher layer will be described.

When one PDSCH is received in a primary cell indicated by detection of a corresponding PDCCH/EPDCCH and the UL-DL configuration of the primary cell belongs to 0, the mobile station devices 1 may select one resource of the PUCCH format 1a/1b using the first method or the second method. On this occasion, no PDSCH is received in a secondary cell. The secondary cell may not be configured.

When one PDSCH is received in a primary cell indicated by detection of a corresponding PDCCH/EPDCCH, the UL-DL configuration of the primary cell belongs to one of 1 to 6, and the value of a DAI (Downlink Assignment Index) field of the DCI transmitted by the PDCCH/EPDCCH is equal to 1, the mobile station devices 1 may select one resource of the PUCCH format 1a/1b using the first method or the second method. On this occasion, no PDSCH is received in a secondary cell. The secondary cell may not be configured.

In an uplink subframe in which HARQ response information to PDSCH transmission in a plurality of downlink subframes can be transmitted, when one PDSCH is received in a primary cell indicated by detection of a corresponding PDCCH, the UL-DL configuration of the primary cell belongs to one of 1 to 6, and the value of the DAI (Downlink Assignment Index) field of the DCI transmitted by the corresponding PDCCH is greater than 1, the mobile station devices 1 may select one resource of the PUCCH format 3 using the second method. On this occasion, the TPC command field of the DCI with the DAI having a value greater than 1 may be used to select one parameter from a plurality of parameters to the PUCCH format 3.

In an uplink subframe in which HARQ response information to PDSCH transmission in a plurality of downlink subframes can be transmitted, when one PDSCH is received in a primary cell indicated by detection of a corresponding EPDCCH, the UL-DL configuration of the primary cell belongs to one of 1 to 6, and the value of the DAI (Downlink Assignment Index) field of the DCI transmitted by the corresponding EPDCCH is greater than 1, the mobile station devices 1 may select one resource of the PUCCH format 3 using the second method. On this occasion, the ARO field of the DCI having a value greater than 1 may be used to select one parameter from a plurality of parameters to the PUCCH format 3.

When at least one PDSCH is received in the secondary cell, the mobile station devices 1 may select one resource of the PUCCH format 3 using the second method. On this occasion, the TPC command field of the DCI transmitted by a PDCCH/EPDCCH corresponding to the PDSCH in the secondary cell may be used to select one parameter from a plurality of parameters to the PUCCH format 3. On this occasion, when one PDSCH is received in the primary cell indicated by detection of a corresponding PDCCH, and the UL-DL configuration of the primary cell belongs to one of 1 to 6, the TPC command field of the DCI with the DAI having a value greater than 1 may be used to select one parameter from a plurality of parameters to the PUCCH format 3. On this occasion, when one PDSCH is received in the primary cell indicated by detection of a corresponding EPDCCH, and the UL-DL configuration of the primary cell belongs to one of 1 to 6, the ARO field of the DCI with the DAI having a value greater than 1 may be used to select one parameter from a plurality of parameters to the PUCCH format 3. On this occasion, the mobile station devices 1 may consider that the ARO field and the TPC command field which are used to select one parameter from a plurality of parameters to the PUCCH format 3 and transmitted in the primary cell and each secondary cell represent the same parameters.

That is, the mobile station devices 1 may select the first method or the second method based on the UL-DL configuration of the primary cell, the DAI, where or not the PDSCH is received by the secondary cell, whether or not the secondary cell is configured, or the like.

The DAI is transmitted when the UL-DL configuration belongs to one of 1 to 6. The DAI represents the cumulative value of a PDCCH/EPDCCH in which PDSCH transmission is allocated and a PDCCH/EPDCCH indicating a downlink SPS resource to a present subframe among a plurality of downlink subframes corresponding to one uplink subframe, in which HARQ response information to PDSCH transmission in a plurality of downlink subframes can be transmitted.

The mobile station device 1 and the base station device 3 of the invention can be expressed as follows.

(1) The invention provides the following means. That is, a terminal of this embodiment which communicates with a base station includes a subframe configuration unit which determines a search space of control channels to be monitored by the terminal for each subframe based on a first uplink-downlink configuration specific to the base station, a second uplink-downlink configuration specific to the terminal, and one or more EPDCCH subframe configurations. The terminal includes a reception unit which performs monitoring of the control channels for the search space determined by the subframe configuration unit.

(2) In the terminal of this embodiment, the subframe configuration unit may be configured to further determine processing on the control channels to be monitored by the terminal for each subframe.

(3) In the terminal of this embodiment, the processing may be mapping of the control channels to resource elements.

(4) A base station of this embodiment which communicates with a terminal includes a subframe configuration unit which determines a search space of control channels to be monitored by the terminal for each subframe based on a first uplink-downlink configuration specific to the base station, a second uplink-downlink configuration specific to the terminal, and one or more EPDCCH subframe configurations. The base station includes a transmission unit which maps control channels addressed to the terminal to the search space determined by the subframe configuration unit.

(5) The subframe configuration unit may be configured to further determine processing on the control channels addressed to the terminal for each subframe.

(6) In the base station of this embodiment, the processing may be mapping of the control channels to resource elements.

(7) A communication method of this embodiment which is used in a terminal communicating with a base station includes determining a search space of control channels to be monitored by the terminal for each subframe based on a first uplink-downlink configuration specific to the base station, a second uplink-downlink configuration specific to the terminal, and one or more EPDCCH subframe configurations, and performing monitoring of the control channels for the search space.

(8) A communication method of this embodiment which is used in a base station communicating with a terminal includes determining a search space of control channels to be monitored by the terminal for each subframe based on a first uplink-downlink configuration specific to the base station, a second uplink-downlink configuration specific to the terminal, and one or more EPDCCH subframe configurations, and mapping the control channels addressed to the terminal to the search space.

(9) An integrated circuit of this embodiment which is implemented by a terminal communicating with a base station includes determining a search space of control channels to be monitored by the terminal for each subframe based on a first uplink-downlink configuration specific to the base station, a second uplink-downlink configuration specific to the terminal, and one or more EPDCCH subframe configurations, and performing monitoring of the control channels for the search space.

(10) An integrated circuit of this embodiment which is implemented by a base station communicating with a terminal includes determining a search space of control channels to be monitored by the terminal for each subframe based on a first uplink-downlink configuration specific to the base station, a second uplink-downlink configuration specific to the terminal, and one or more EPDCCH subframe configurations, and mapping the control channels addressed to the terminal to the search space.

The mobile station device 1 and the base station device 3 of the invention can be expressed as follows.

(1) In order to attain the above-described object, the invention provides the following means. That is, a terminal of this embodiment which communicates with a base station includes a subframe configuration unit which determines monitoring of control channels to the terminal for each subframe based on a first uplink-downlink configuration specific to the base station, a second uplink-downlink configuration specific to the terminal, and one or more EPDCCH subframe configurations, a reception unit which receives a PDSCH indicated by the control channels detected based on the monitoring from the base station, and a transmission unit which generates a PUCCH including HARQ response information to the PDSCH and transmits the PUCCH to the base station using a PUCCH resource determined based on a configuration to the monitoring.

(2) In the terminal of this embodiment, the PUCCH resource may be determined based on information concerning a resource used to transmit the control channels and parameters configured independently for the respective monitoring.

(3) In the terminal of this embodiment, the PUCCH resource may be determined based on one parameter selected from a plurality of parameters configured by a higher layer using the control channels.

(4) In the terminal of this embodiment, the PUCCH resource may be different in a method of determining a PUCCH resource based on monitoring performed in a fixed subframe or monitoring performed in a flexible subframe.

(5) A base station of this embodiment which communicates with a terminal includes a subframe configuration unit which determines monitoring of control channels to the terminal for each subframe based on a first uplink-downlink configuration specific to the base station, a second uplink-downlink configuration specific to the terminal, and one or more EPDCCH subframe configurations, a transmission unit which transmits the mapped control channels based on the monitoring and a PDSCH indicated by the control channels to the terminal, and a reception unit which receives a PUCCH including HARQ response information to the PDSCH transmitted using the PUCCH resource determined based on a configuration to the monitoring from the terminal.

(6) In the base station of this embodiment, the PUCCH resource may be determined based on information concerning a resource used to transmit the control channels and parameters configured independently for the respective monitoring.

(7) In the base station of this embodiment, the PUCCH resource may be determined based on one parameter selected from a plurality of parameters configured by a higher layer using the control channels.

(8) In the base station of this embodiment, the PUCCH resource may be different in a method of determining a PUCCH resource based on monitoring performed in a fixed subframe or monitoring performed in a flexible subframe.

(9) A communication method of this embodiment which is used in a terminal communicating with a base station includes a step of determining monitoring of control channels to the terminal for each subframe based on a first uplink-downlink configuration specific to the base station, a second uplink-downlink configuration specific to the terminal, and one or more EPDCCH subframe configurations, a step of receiving a PDSCH indicated by the control channels detected based on the monitoring from the base station, and a step of generating a PUCCH including HARQ response information to the PDSCH and transmitting the PUCCH to the base station using a PUCCH resource determined based on a configuration to the monitoring.

(10) A communication method of this embodiment which is used in a base station communicating with a terminal includes a step of determining monitoring of control channels to the terminal for each subframe based on a first uplink-downlink configuration specific to the base station, a second uplink-downlink configuration specific to the terminal, and one or more EPDCCH subframe configurations, a step of transmitting the mapped control channels based on the monitoring and a PDSCH indicated by the control channels to the terminal, and a step of receiving a PUCCH including HARQ response information to the PDSCH transmitted using the PUCCH resource determined based on a configuration to the monitoring from the terminal.

(11) An integrated circuit of this embodiment which is implemented by a terminal communicating with a base station has a function of determining monitoring of control channels to the terminal for each subframe based on a first uplink-downlink configuration specific to the base station, a second uplink-downlink configuration specific to the terminal, and one or more EPDCCH subframe configurations, a function of receiving a PDSCH indicated by the control channels detected based on the monitoring from the base station, and a function of generating a PUCCH including HARQ response information to the PDSCH and transmitting the PUCCH to the base station using a PUCCH resource determined based on a configuration to the monitoring.

(12) An integrated circuit of this embodiment which is implemented by a base station communicating with a terminal has a function of determining monitoring of control channels to the terminal for each subframe based on a first uplink-downlink configuration specific to the base station, a second uplink-downlink configuration specific to the terminal, and one or more EPDCCH subframe configurations, a function of transmitting the mapped control channels based on the monitoring and a PDSCH indicated by the control channels to the terminal, and a function of receiving a PUCCH including HARQ response information to the PDSCH transmitted using the PUCCH resource determined based on a configuration to the monitoring from the terminal.

A program operating in the base station device 3 and the mobile station device 1 of the invention is a program (a program for causing a computer to function) to control a CPU (Central Processing Unit) and the like so as to implement the functions of the foregoing embodiment of the invention. Information which is handled by the devices is temporarily accumulated in a RAM (Random Access Memory) while processed, and is then stored in various ROMs, such as a Flash ROM (Read Only Memory), or an HDD (Hard Disk Drive). Information is read by the CPU as necessary, and is modified and written.

Part of the mobile station device 1 and the base station device 3 in the foregoing embodiment may be implemented by a computer. In this case, a program for implementing the control function may be recorded in a computer-readable recording medium, and the program recorded in the recording medium may be read on a computer system and executed.

The term "computer system" used herein is a computer system which is incorporated in the mobile station device 1 or the base station device 3, and includes an OS or hardware, such as peripherals. The term "computer-readable recording medium" refers to a portable medium, such as a flexible disk, a magneto-optical disk, a ROM, or a CD-ROM, or a storage device, such as a hard disk incorporated in the computer system.

The term "computer-readable recording medium" may include a medium which holds the program in a short period of time or dynamically, such as a communication line when transmitting the program through a network, such as Internet, or a communication line, such as a telephone line, and a medium which holds the program in a certain period of time, such as a volatile memory inside the computer system to be a server or a client. The program may implement some of the above-described functions or may implement the above-described functions in combination with the program already recorded in the computer system.

The base station device 3 in the foregoing embodiment may be implemented as an aggregate (device group) of a plurality of devices. Each device in the device group may include part or all of the functions or the function blocks of the base station device 3 of the foregoing embodiment. As the device group, the general functions or functional blocks of the base station device 3 may be provided. The mobile station device 1 of the foregoing embodiment may communicate with the base station device as an aggregate.

The base station device 3 in the foregoing embodiment may be EUTRAN (Evolved Universal Terrestrial Radio Access Network). The base station device 3 in the foregoing embodiment may have part or all of the functions of an upper node to eNodeB.

Part or all of the mobile station device 1 and the base station device 3 of the foregoing embodiment may be typically implemented as an LSI, which is an integrated circuit, or may be implemented as a chipset. The functional blocks of the mobile station device 1 and the base station device 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the foregoing embodiment, a mobile station device has been described as a terminal device or a communication device, the invention is not limited thereto and may be applied to stationary or immovable electronic apparatuses indoors and outdoors, for example, terminal devices, such as an AV system, kitchen equipment, cleaning and washing equipment, air conditioning equipment, office equipment, vending machine, and other living appliances, or communication devices.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

INDUSTRIAL APPLICABILITY

The invention can be applied to a mobile phone, a personal computer, a tablet computer, and the like.

DESCRIPTION OF REFERENCE NUMERALS 1 (1A, 1B, 1C) mobile station device
3 base station device
101 upper-layer processing unit
103 control unit
105 reception unit
107 transmission unit
301 upper-layer processing unit
303 control unit
305 reception unit
307 transmission unit
1011 radio resource control unit
1013 subframe configuration unit
1015 scheduling information interpretation unit
1017 CSI report control unit
3011 radio resource control unit
3013 subframe configuration unit
3015 scheduling unit
3017 CSI report control unit

The invention claimed is:
1. A terminal configured to communicate with a base station, the terminal comprising:
transmission circuitry that transmits a plurality of Hybrid Automatic Repeat Request (HARQ) Acknowledgments (ACKs) using a resource selected from a plurality of resources of physical uplink control channels, the plurality of HARQ-ACKs being for transmissions of physical downlink shared channels indicated by detections of physical downlink control channels in a plurality of subframes, wherein
in a case that a first subframe in the plurality of subframes is included in a first set of subframes, a first resource in the plurality of resources of physical uplink control channels is given by a computation using a number of a first control channel element used for a transmission of a physical downlink control channel in the first subframe and a first value configured by a higher layer, the first resource corresponding to a physical downlink shared channel transmission indicated by a detection of a physical downlink control channel in the first subframe, in a case that a second subframe in the plurality of subframes is included in a second set of subframes, a second resource in the plurality of resources of physical uplink control channels is given by a computation using a number of a first control channel element used for a transmission of a physical downlink control channel in the second subframe and a second value configured by the higher layer, the second resource corresponding to a physical downlink shared channel transmission indicated by a detection of a physical downlink control channel in the second subframe, the first set of subframes and the second set of subframes are determined based on a first parameter and a second parameter the first parameter and the second parameter being configured by the higher layer and indicating uplink-downlink configurations, a subframe indicated as a downlink subframe or a special subframe by the first parameter is not used as an uplink subframe, and a subframe indicated as an uplink subframe or a special subframe by the second parameter is not used as a downlink subframe.

2. A base station configured to communicate with a terminal, the base station comprising:

reception circuitry that receives a plurality of Hybrid Automatic Repeat Request (HARQ) Acknowledgments (ACKs) using a resource selected from a plurality of resources of physical uplink control channels, the plurality of HARQ-ACKs being for transmissions of physical downlink shared channels indicated by detections of physical downlink control channels in a plurality of subframes, wherein in a case that a first subframe in the plurality of subframes is included in a first set of subframes, a first resource in the plurality of resources of physical uplink control channels is given by a computation using a number of a first control channel element used for a transmission of a physical downlink control channel in the first subframe and a first value configured by a higher layer, the first resource corresponding to a physical downlink shared channel transmission indicated by a detection of a physical downlink control channel in the first subframe, in a case that a second subframe in the plurality of subframes is included in a second set of subframes, a second resource in the plurality of resources of physical uplink control channels is given by a computation using a number of a first control channel element used for a transmission of a physical downlink control channel in the second subframe and a second value configured by the higher layer, the second resource corresponding to a physical downlink shared channel transmission indicated by a detection of a physical downlink control channel in the second subframe, the first set of subframes and the second set of subframes are determined based on a first parameter and a second parameter, the first parameter and the second parameter being configured by the higher layer and indicating uplink-downlink configurations, a subframe indicated as a downlink subframe or a special subframe by the first parameter is not used as an uplink subframe, and a subframe indicated as an u link subframe or as special subframe by the second parameter is not used as a downlink subframe.

3. A communication method for a terminal configured to communicate with a base station, the communication method comprising:

transmitting a plurality of Hybrid Automatic Repeat Request (HARQ) Acknowledgments (ACKs) using a resource selected from a plurality of resources of physical uplink control channels, the plurality of HARQ-ACKs being for transmissions of physical downlink shared channels indicated by detections of physical downlink control channels in a plurality of subframes, wherein in a case that a first subframe in the plurality of subframes is included in a first set of subframes, a first resource in the plurality of resources of physical uplink control channels is given by a computation using a number of a first control channel element used for a transmission of a physical downlink control channel in the first subframe and a first value configured by a higher layer, the first resource corresponding to a physical downlink shared channel transmission indicated by a detection of a physical downlink control channel in the first subframe, in a case that a second subframe in the plurality of subframes is included in a second set of subframes, a second resource in the plurality of resources of physical uplink control channels is given by a computation using a number of a first control channel element used for a transmission of a physical downlink control channel in the second subframe and a second value configured by the higher layer, the second resource corresponding to a physical downlink shared channel transmission indicated by a detection of a physical downlink control channel in the second subframe, the first set of subframes and the second set of subframes are determined based on a first parameter and a second parameter, the first parameter and the second parameter being configured by the higher layer and indicating uplink-downlink configurations, a subframe indicated as a downlink subframe or a special subframe by the first parameter is not used as an uplink subframe, and a subframe indicated as an uplink subframe or a special subframe by the second parameter is not used as a downlink subframe.

4. A communication method for a base station configured to communicate with a terminal, the communication method comprising:

receiving a plurality of Hybrid Automatic Repeat Request (HARQ) Acknowledgments (ACKs) using a resource selected from a plurality of resources of physical uplink control channels, the plurality of HARQ-ACKs being for transmissions of physical downlink shared channels indicated by detections of physical downlink control channels in a plurality of subframes, wherein in a case that a first subframe in the plurality of subframes is included in a first set of subframes, a first resource in the plurality of resources of physical uplink control channels is given by a computation using a number of a first control channel element used for a transmission of a physical downlink control channel in the first subframe and a first value configured by a higher layer, the first resource corresponding to a physical downlink shared channel transmission indicated by a detection of a physical downlink control channel in the first subframe, in a case that a second subframe in the plurality of subframes is included in a second set of subframes, a second resource in the plurality of resources of physical uplink control channels is given by a computation using a number of a first control channel element used for a transmission of a physical downlink control channel in the second subframe and a second value configured by the higher layer, the second resource corresponding to a physical downlink shared channel transmission indicated by a detection of a physical downlink control channel in the second subframe, the first set of subframes and the second set of subframes are determined based on a first parameter and a second parameter, the first parameter and the second parameter being configured by the higher layer and indicating uplink-downlink configurations, a subframe indicated as a downlink subframe or a special subframe by the first parameter is not used as an uplink subframe, and a subframe indicated as an uplink subframe or a special subframe by the second parameter is not used as a downlink subframe.

* * * * *